United States Patent
Shibata et al.

(10) Patent No.: US 9,903,982 B2
(45) Date of Patent: Feb. 27, 2018

(54) ANTIREFLECTION ARTICLE, POLARIZING PLATE, COVER GLASS AND IMAGE DISPLAY DEVICE, AND MANUFACTURING METHOD OF ANTIREFLECTION ARTICLE

(71) Applicant: FUJIFILM Corporation, Tokyo (JP)

(72) Inventors: Naoya Shibata, Kanagawa (JP); Miho Asahi, Kanagawa (JP); Hajime Nakayama, Kanagawa (JP); Ayako Matsumoto, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 15/059,899

(22) Filed: Mar. 3, 2016

(65) Prior Publication Data

US 2016/0259092 A1 Sep. 8, 2016

(30) Foreign Application Priority Data

Mar. 4, 2015 (JP) ................... 2015-042474
Jul. 10, 2015 (JP) ................... 2015-138949

(51) Int. Cl.
*G02B 27/00* (2006.01)
*G02B 1/118* (2015.01)
(Continued)

(52) U.S. Cl.
CPC ............ *G02B 1/118* (2013.01); *C03C 17/007* (2013.01); *C03C 17/008* (2013.01); *G02B 1/111* (2013.01);
(Continued)

(58) Field of Classification Search
CPC ............ G02B 1/118; G02B 1/14; G02B 1/111; G02B 5/3033; G02B 1/00; G02B 1/002; G02B 1/005; G02B 1/10; G02B 1/11
(Continued)

(56) References Cited

U.S. PATENT DOCUMENTS

2015/0177425 A1* 6/2015 Kondo ............... G02B 5/0226
428/149
2015/0276991 A1* 10/2015 Uchimura ............ G02B 1/118
428/148

(Continued)

FOREIGN PATENT DOCUMENTS

JP 07-104103 A 4/1995
JP 2009-139796 A 6/2009
(Continued)

OTHER PUBLICATIONS

Japanese Notification of Reason for Refusal dated Jan. 9, 2018 in connection with Japanese Patent Application No. 2015-138949.

*Primary Examiner* — Arnel C Lavarias
(74) *Attorney, Agent, or Firm* — Edwards Neils LLC; Jean C. Edwards, Esq.

(57) ABSTRACT

An antireflection article includes a substrate; and an antireflection layer containing a binder resin and inorganic particles, wherein the inorganic particles are particles having an average primary particle diameter of 150 nm to 250 nm and a CV value of 4% or less, 99.9% or more of the inorganic particles are perfectly spherical particles, the antireflection layer includes a moth eye structure composed of an unevenness shape formed by the inorganic particles on a surface of the antireflection layer, and an area occupancy ratio of the inorganic particles on the surface of the antireflection layer is 25% to 64%.

16 Claims, 1 Drawing Sheet

(51) Int. Cl.
  *G02B 1/111* (2015.01)
  *G02B 1/14* (2015.01)
  *G02B 5/30* (2006.01)
  *C03C 17/00* (2006.01)
(52) U.S. Cl.
  CPC ............ *G02B 1/14* (2015.01); *G02B 5/3033* (2013.01); *C03C 2217/43* (2013.01); *C03C 2217/445* (2013.01); *C03C 2217/465* (2013.01); *C03C 2217/475* (2013.01); *C03C 2217/478* (2013.01); *C03C 2217/732* (2013.01)
(58) Field of Classification Search
  USPC ....... 359/601, 609, 577, 580, 581, 582, 586, 359/589
  See application file for complete search history.

(56) References Cited

U.S. PATENT DOCUMENTS

2016/0077239 A1\* 3/2016 Asahi .................... G02B 1/118
                                                         359/492.01
2016/0077240 A1   3/2016 Asahi et al.

FOREIGN PATENT DOCUMENTS

| | | |
|---|---|---|
| JP | 2010-042984 A | 2/2010 |
| JP | 2010-164824 A | 7/2010 |
| JP | 2014-240956 A | 12/2014 |
| WO | 2008/105117 A1 | 9/2008 |
| WO | 2011/111471 A1 | 9/2011 |

\* cited by examiner

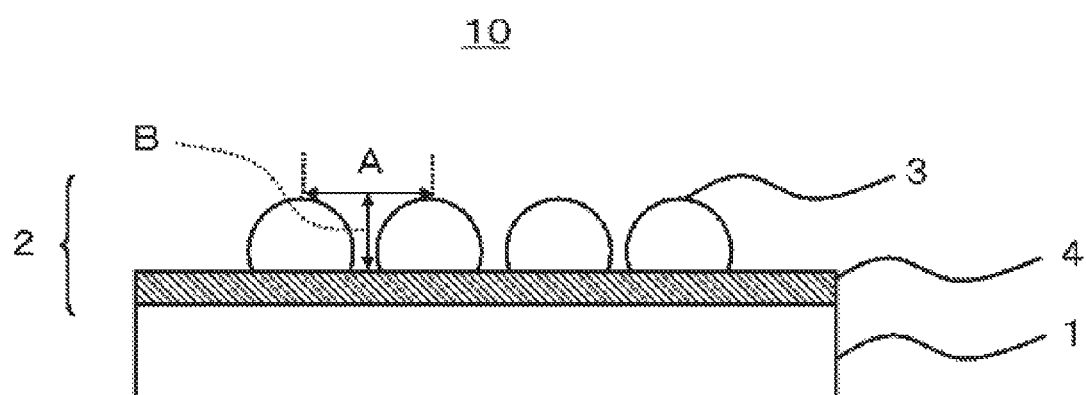

ANTIREFLECTION ARTICLE, POLARIZING PLATE, COVER GLASS AND IMAGE DISPLAY DEVICE, AND MANUFACTURING METHOD OF ANTIREFLECTION ARTICLE

CROSS REFERENCE TO RELATED APPLICATION(S)

This application claims priority from Japanese Patent Application Nos. 2015-042474 filed on Mar. 4, 2015 and 2015-138949 filed on Jul. 10, 2015, the entire disclosures of which are incorporated herein by reference.

BACKGROUND

1. Technical Field

The present invention relates to an antireflection article, a polarizing plate, a cover glass and an image display device, and a manufacturing method of an antireflection article.

2. Related Art

In an image display device such as a cathode ray tube display device (CRT), a plasma display panel (PDP), an electroluminescent display (ELD), a vacuum fluorescent display (VFD), a field emission display (FED), and a liquid crystal display (LCD), an antireflection film may be provided in some cases in order to prevent a reduction in contrast or glare of an image due to reflection of external light on a display surface of the device. Further, it is possible to impart an antireflection function by an antireflection film in addition to an image display device in some cases.

As the antireflection film, there has been known an antireflection film having a fine unevenness shape on a surface of a substrate, of which a period is equal to or shorter than the wavelengths of visible rays, so-called an antireflection film having a moth eye structure. Due to the moth eye structure, a refractive index gradient layer in which a refractive index is continuously varied from air toward a bulk material at an inside of the substrate is artificially formed, so that light may be prevented from being reflected.

As an antireflection layer having a moth eye structure, Japanese Patent Laid-Open Publication No. 7-104103 describes an antireflection film having an unevenness structure, manufactured by removing a binder resin which contains particles formed on a plastic film substrate while remaining the back part of the particles by means of dry etching.

However, it has been found that for the antireflection film described in Japanese Patent Laid-Open Publication No. 7-104103, during black display when used on a surface of a display, or when used on a surface of glass in a dark showroom, and the like, a blue tint resulting from the wavelength dependence of reflectance is generated.

An object of the present invention is to provide an antireflection article having a moth eye structure on a surface thereof, in which the reflectance is low and a blue tint is also suppressed from being generated. In addition, another object of the present invention is to provide a polarizing plate, a cover glass and an image display device, which include the antireflection article, and a manufacturing method of an antireflection article.

The present inventors have reviewed on the generation of the blue tint, and surprisingly, have found that the blue tint may be improved by decreasing an area occupancy ratio of inorganic particles (referred to as a "particle occupancy ratio") on a surface of an antireflection layer having a moth eye structure. Meanwhile, it has been found that, within a range where the particle occupancy ratio is low, aggregation of the particles is easily generated, and the reflectance is easily increased.

The present inventors have intensively studied and found that the above-described problem can be solved by using, as particles forming a moth eye structure, mono-disperse particles having a CV value of 4% or less, setting the ration of perfectly spherical particles (perfectly spherical particle ratio) to 99.9% or more, and setting the area occupancy ratio of the particles to 25% to 64%.

SUMMARY

That is, the above-described problems may be solved by the following means.

[1] An antireflection article including:
a substrate; and
an antireflection layer containing a binder resin and inorganic particles,
wherein the inorganic particles are particles having an average primary particle diameter of 150 nm to 250 nm and a CV value of 4% or less,
99.9% or more of the inorganic particles are perfectly spherical particles,
the antireflection layer includes a moth eye structure composed of an unevenness shape formed by the inorganic particles on a surface of the antireflection layer, and
an area occupancy ratio of the inorganic particles on the surface of the antireflection layer is 25% to 64%.

[2] The antireflection article of [1],
wherein an average value of distances between closest particles of the inorganic particles is 30 nm or more.

[3] The antireflection article of [1] or [2],
wherein the area occupancy ratio of the inorganic particles on the surface of the antireflection layer is 25% to 50%.

[4] The antireflection article of any one of [1] to [3],
wherein the inorganic particles have an indentation hardness of 400 MPa or more.

[5] The antireflection article of any one of [1] to [4],
wherein the inorganic particles are silica particles.

[6] The antireflection article of any one of [1] to [4],
wherein the inorganic particles are alumina particles.

[7] The antireflection article of any one of [1] to [6],
wherein the inorganic particles are surface-modified particles.

[8] The antireflection article of any one of [1] to [7],
wherein the substrate is a plastic substrate.

[9] The antireflection article of [8],
wherein the antireflection article includes a permeation layer containing a component which forms the plastic substrate, and a binder resin in the antireflection layer, between the plastic substrate and the antireflection layer.

[10] The antireflection article of [8] or [9],
wherein the plastic substrate is a film-type plastic substrate, and
the antireflection article is a film-type antireflection article.

[11] The antireflection article of [10],
wherein the antireflection film has a repeated folding resistance in which the number of times of folding endurance measured by an MIT tester in accordance with the JIS P8115 (2001) is 1,000 or more.

[12] A polarizing plate including a polarizer and at least one protective film which protects the polarizer,
wherein the at least one protective film is the antireflection article of [10] or [11].

[13] A cover glass including the antireflection article of [10] or [11] as a protective film.

[14] An image display device including the antireflection article of any one of [1] to [11], the polarizing plate of [12], or the cover glass of [13].

[15] A method of manufacturing an antireflection article including a substrate and an antireflection layer containing a binder resin and inorganic particles, wherein the antireflection layer includes a moth eye structure composed of an unevenness shape formed by the inorganic particles on a surface of the antireflection layer, and an area occupancy ratio of the inorganic particles on the surface of the antireflection layer is 25% to 64%, the method including:

applying a composition for forming an antireflection layer, which contains inorganic particles in which 99.9% or more are perfectly spherical particles, the inorganic particles having an average primary particle diameter of 150 nm to 250 nm and a CV value of 4% or less, and a polymerizable compound for forming a binder resin onto a substrate, forming a binder resin layer by polymerizing the applied polymerizable compound for forming the binder resin, and forming the moth eye structure composed of the unevenness shape by etching the binder resin layer.

[16] A method of manufacturing an antireflection article including, in this order, a plastic substrate, a permeation layer, and an antireflection layer containing a binder resin and inorganic particles, wherein the antireflection layer includes a moth eye structure composed of an unevenness shape formed by the inorganic particles on a surface of the antireflection layer, and an area occupancy ratio of the inorganic particles on the surface of the antireflection layer is 25% to 64%, the method including:

applying, onto a plastic substrate, a composition for forming an antireflection layer containing:
  inorganic particles in which 99.9% or more are perfectly spherical particles, the inorganic particles having an average primary particle diameter of 150 nm to 250 nm and a CV value of 4% or less;
  a polymerizable compound for forming a binder resin; and
  a solvent having permeability to a plastic substrate, and
making parts of the solvent having permeability to the plastic substrate and the polymerizable compound for forming the binder resin permeate into the plastic substrate to form a permeation layer.

According to the an exemplary embodiment of the present invention, it is possible to provide an antireflection article having a moth eye structure on a surface thereof, in which the reflectance is low and a blue tint is also suppressed from being generated. In addition, another object of the present invention is to provide a polarizing plate, a cover glass and an image display device, which include the antireflection article, and a manufacturing method of an antireflection article.

BRIEF DESCRIPTION OF DRAWINGS

FIG. 1 is a cross-sectional schematic view illustrating an example of the antireflection article of the present invention.

DETAILED DESCRIPTION OF EXEMPLARY EMBODIMENTS

[Antireflection Article]

An antireflection article of the present invention according to one exemplary embodiment of the present invention is an antireflection article including a substrate and an antireflection layer containing a binder resin and inorganic particles, in which the inorganic particles are particles having an average primary particle diameter of 150 nm to 250 nm and a CV value of 4% or less and including 99.9% or more perfectly spherical particles therein, the antireflection layer includes a moth eye structure composed of an unevenness shape formed by the inorganic particles on a surface thereof, and an area occupancy ratio of the inorganic particles on the surface of the antireflection layer is 25% to 64%.

FIG. 1 illustrates an example of preferred exemplary embodiments of the antireflection article of the present invention.

An antireflection article 10 in FIG. 1 includes a and an antireflection layer 2. The antireflection layer 2 has a moth eye structure composed of an unevenness shape formed by moth eye particles (inorganic particles) 3 on a surface opposite to the substrate 1.

The antireflection layer 2 is composed of moth eye particles 3 and a binder resin 4.

(Moth Eye Structure)

A surface opposite to an interface at a side of the substrate of the antireflection layer has a moth eye structure composed of an unevenness shape formed by the inorganic particles.

Here, the moth eye structure is a surface processed with a substance (material) for suppressing reflection of light, and refers to a structure having a periodic fine structured pattern. Particularly, for the purpose of suppressing reflection of visible light, the moth eye structure refers to a structure having a fine structured pattern with a period of less than 780 nm. When the period of the fine structured pattern is less than 380 nm, the period is preferred in that the hue of the reflected light is reduced. Furthermore, when the period of the unevenness shape of the moth eye structure is 100 nm or more, the period is preferred because light with a wavelength of 380 nm may recognize the fine structured pattern, and thus the antireflection property is excellent. The presence and absence of the moth eye structure may be confirmed by observing the surface shape by a scanning electron microscope (SEM), an atomic force microscope (AFM), or the like, and examining whether the fine structured pattern is formed.

It is preferred that the unevenness shape of the antireflection layer of the antireflection article of the present invention has a ratio B/A of 0.4 or more, which is a ratio of a distance A between vertices of adjacent convex portions and a distance B between a center of the vertices of the adjacent convex portions and a concave portion. When B/A is 0.4 or more, the depth of the concave portion is increased with respect to the distance between the convex portions, so that a reflective index gradient layer whose refractive index is varied more moderately from the air to the inside of the antireflection layer is produced. Therefore, the reflectance may be more reduced.

The ratio B/A may be controlled by a volume ratio of the binder resin and the inorganic particles in the antireflection layer after being cured. For that reason, it is important to appropriately design a blending ratio of the binder resin and the inorganic particles. Further, the binder resin penetrates into the substrate or is volatilized during the process of manufacturing the moth eye structure, so that the volume ratio of the binder resin and the inorganic particles in the antireflection layer may be different from the blending ratio in a composition for forming an antireflection layer in some cases. Therefore, it is also important to appropriately set matching with the substrate.

In addition, in order to suppress the blue tint from being generated, it is preferred that the inorganic particles forming the convex portions are uniformly spread at an appropriate filling ratio. From the above-described viewpoint, it is preferred that the content of the inorganic particles forming the convex portions is adjusted to be uniform throughout the antireflection layer. The filling ratio may be measured as an area occupancy ratio (particle occupancy ratio) of the inorganic particles located closest to the surface side when the inorganic particles forming the convex portions on the surface are observed by SEM and the like, and is 25% to 64%, preferably 30% to 45%, and more preferably 30% to 45%.

(Inorganic Particles)

It is preferred that the inorganic particles (also referred to as 'moth eye particles') forming a moth eye structure in the antireflection layer are metal oxide particles.

It is preferred that the inorganic particles have a spherical shape. In the present invention, 99.9% or more of the particles included in the antireflection layer are perfectly spherical particles, and preferably 100% of the particles are perfectly spherical particles. A perfectly spherical particle means that when a particle is observed in a direction vertical to the surface of the antireflection layer, a ratio of the major diameter and the minor diameter is 0.95 to 1.05.

In the case where an antireflection layer is prepared by applying a coating solution containing particles onto a substrate, if the impact is excessively strong when the particles in the preparation of the coating solution are dispersed or when the particles are disentangled after a firing treatment, the particles are deformed or damaged, so that the case is not preferred because the distribution uniformity of the particles is damaged particularly in a region where the particle occupancy ratio is low.

As the inorganic particles, it is possible to suitably use particles having an average primary particle diameter of 150 nm to 250 nm, in which a polydispersity of the average primary particle diameter (CV value) is 4% or less. The CV value is a value (unit: %) which may be obtained by a calculation of $$CV \text{ value} = ([\text{Standard deviation of average primary particle diameter}]/[\text{Average particle diameter}]) \times 100$$

and a smaller CV value means that the average primary particle diameter is uniform. The average primary particle diameter is measured by using a scanning electron microscope (SEM). The average particle diameter of the particles and the standard deviation thereof are calculated on the basis of the measured values of the particle diameters of 200 or more particles. Even in the case of a mixture composed of particles of a plurality of species having different average primary particle diameters, the overall CV value of the particles is calculated.

Since it is possible to serve as an antireflection layer having a moth eye structure when the average primary particle diameter is 150 nm or more, and it is difficult for the Bragg diffraction caused by the regular arrangement of the inorganic particles to occur in a visible light region when the average primary particle diameter is 250 nm or less, a color development (interference coloration) phenomenon resulting from the Bragg diffraction is not shown. Accordingly, the smaller the CV value is, the more difficult it is for aggregation of the particles to occur, and it is possible to form a high transmittance antireflection layer having a moth eye structure by using a low reflectance without any interference coloration. Therefore, a small CV value is preferred.

An average primary particle diameter of the inorganic particles is preferably 150 nm to 230 nm, and more preferably 160 nm to 200 nm.

The lower limit of the CV value of the inorganic particles is ideally 0.0%, but substantially about 0.1%. The upper limit of the CV value of the inorganic particles is preferably 3.5% or less, and more preferably 3% or less.

For a reason that the CV value may be decreased, as the inorganic particles, it is preferred to contain only metal oxide particles having a primary particle diameter of 150 nm to 250 nm, more preferred to contain only metal oxide particles having a primary particle diameter of 160 nm to 230 nm, and even more preferred to contain only metal oxide particles having a primary particle diameter of 160 nm to 200 nm.

The average primary particle diameter of the inorganic particles refers to a 50% cumulative particle diameter of the volume average particle diameter. When the average primary particle diameter of the inorganic particles included in the antireflection layer is measured, the particle diameter may be measured by electron microscope photographs. For example, the 50% cumulative particle diameter may be used as an average primary particle diameter by performing an SEM observation of an antireflection article at the surface side thereof at an appropriate magnification (about 5,000 times), and measuring the diameter of each of 100 primary particles to calculate the volume thereof. In this case, for ease of observation, carbon deposition or etching processing and the like may be appropriately performed on the sample.

In the present invention, the amount of hydroxyl groups on the particle diameter is defined as follows. The amount of hydroxyl groups is measured by a solid-state 29Si NMR (29Si CP/MAS). When a signal intensity of a metal element M on a surface of a metal oxide particle, which is bound to n hydroxyl groups, is assumed as $Q_n$, the amount of hydroxyl groups on the particle diameter is a sum of the existing $Q_n \times n \div$ (the square of a particle radius (unit: nm)). For example, when the particles are silica (particle radius R), silicon bound to four neutral oxygen atoms (signal intensity $Q_0$), silicon bound to three neutral oxygen atoms and one hydroxyl group (signal intensity $Q_1$), and silicon bound to two neutral oxygen atoms and two hydroxyl groups (signal intensity $Q_2$) are present, and the amount of hydroxyl groups on the particle surface is $(Q_1 \times 1 + Q_2 \times 2) \div R^2$. In the case of silica, a signal which imparts the signal intensity $Q_2$, a signal which imparts the signal intensity $Q_1$, and a signal which imparts the signal intensity $Q_0$ have a chemical shift of −91 ppm to −94 ppm, −100 ppm to −102 ppm, or −109 ppm to −111 ppm, respectively.

As the particle surface is hardened by firing, the amount of hydroxyl groups on the particle surface is decreased and preferably $1.00 \times 10^{-5}$ to $1.00 \times 10^{-1}$, more preferably $1.00 \times 10^{-4}$ to $5.00 \times 10^{-2}$, and even more preferably $5.00 \times 10^{-4}$ to $1.00 \times 10^{-3}$.

The indentation hardness of the inorganic particles is preferably 400 MPa or more, more preferably 450 MPa or more, and even more preferably 550 MPa. When the indentation hardness of the inorganic particles is 400 MPa or more, the indentation hardness is preferred, because the durability against pressure in the thickness direction of the moth eye structure is enhanced. Further, the indentation hardness of the inorganic particles is preferably 1,000 MPa or less, such that the inorganic particles do not become fragile and brittle.

The indentation hardness of the inorganic particles may be measured by a nano-indenter, and the like. As a specific measurement technique, the indentation hardness may be measured by placing the inorganic particles side by side on a substrate (a glass plate, a quartz plate, and the like), which is harder than themselves, so as not to overlap in one or more tiers, and pressing the substrate with a diamond indenter. In this case, it is preferred that particles are fixed with a resin and the like so as not to move. Provided that when the particles are fixed with a resin, the measurement is performed by adjusting a portion of the particles so as to be exposed. In addition, it is preferred that the indentation position is specified by a triboindenter.

Even in the present invention, the indentation hardness was obtained by placing the inorganic particles side by side on a substrate, using a small amount of a curable resin so as not to affect a measured value to prepare a sample in which the particles are bound•fixed to each other, and using a method of measuring the sample by an indenter.

The inorganic particles are preferably metal oxide particles, examples of the metal oxide particles include silica particles, alumina particles, titania particles, zirconia particles, antimony pentoxide particles, and the like, but the metal oxide particles are preferably silica particles from the viewpoint that haze is hardly generated and the moth eye structure is easily formed due to the refractive index close to those of many binder resins.

Alumina particles have a high refractive index, and thus are more difficult to be treated than silica particles in terms of optical performance such as reflectance or haze, but are excellent from the viewpoint of strength, and thus are preferred to prepare a film having excellent scratch resistance. Reference may be made to the description in paragraph nos. [0008] to [0060] of Japanese Patent Laid-Open Publication No. H7-206432 for the specific examples and preparation method of alumina particles.

The inorganic particles are preferably surface-treated inorganic particles for the improvement of the dispersibility in a coating solution, the improvement of the film strength, and the prevention of aggregation. Specific examples and preferred examples of a surface treatment method are the same as those described in paragraph nos. [0119] to [0147] of Japanese Patent Laid-Open Publication No. 2007-298974.

In particular, from the viewpoint of improving the film strength by imparting binding property with a binder component, it is preferred that an unsaturated double bond is imparted to the particle surface by surface-modifying the particle diameter with a functional group having an unsaturated double bond and reactivity with the particle surface, and it is more preferred that a (meth)acryloyl group is imparted thereto.

The inorganic particles are particularly preferably fired silica particles for a reason that the inorganic particles have an appropriately large amount of hydroxyl groups on the surface thereof, and are also hard particles.

The fired silica particles may be prepared by a publicly-known technology in which a hydrolysable silicone compound are subjected to hydrolysis and condensation in an organic solvent including water and a catalyst to obtain silica particles, and then the silica particles are fired, and reference may be made to, for example, Japanese Patent Laid-Open Publication Nos. 2003-176121 and 2008-137854, and the like.

The silicone compound as a material for preparing the fired silica particles is not particularly limited, but examples thereof include a chlorosilane compound such as tetrachlorosilane, methyltrichlorosilane, phenyltrichlorosilane, dimethyldichlorosilane, diphenyldichlorosilane, methylvinyldichlorosilane, trimethylchlorosilane, and methyldiphenylchlorosilane; an alkoxysilane compound such as tetramethoxysilane, tetraethoxysilane, tetraisopropoxysilane, tetrabutoxysilane, methyltrimethoxysilane, methyltriethoxysilane, trimethoxyvinylsilane, triethoxyvinylsilane, 3-glycidoxypropyltrimethoxysilane, 3-chloropropyltrimethoxysilane, 3-mercaptopropyltrimethoxysilane, 3-(2-aminoethylamino)propyltrimethoxysilane, phenyltrimethoxysilane, phenyltriethoxysilane, dimethyldimethoxysilane, dimethyldiethoxysilane, 3-glycidoxypropylmethyldimethoxysilane, 3-glycidoxypropylmethyldiethoxysilane, 3-chloropropylmethyldimethoxysilane, diphenyldimethoxysilane, diphenyldiethoxysilane, dimethoxydiethoxysilane, trimethylmethoxysilane, and trimethylethoxysilane; an acyloxysilane compound such as tetraacetoxysilane, methyltriacetoxysilane, phenyltriacetoxysilane, dimethyldiacetoxysilane, diphenyldiacetoxysilane, and trimethylacetoxysilane; a silanol compound such as dimethylsilanediol, diphenylsilanediol, and trimethylsilanol; and the like. Among the silane compounds as exemplified above, the alkoxysilane compound is particularly preferred because the compound is more easily available and no halogen atom is included as an impurity in the resulting tired silica particles. As a preferred form of the fired silica particles according to the present invention, it is preferred that the content of halogen atoms is substantially 0%, and no halogen atom is detected.

The firing temperature is not particularly limited, but is preferably 800° C. to 1,300° C., and more preferably 1,000° C. to 1,200° C.

The fired silica particles are preferably fired silica particles surface-modified with a compound having a (meth)acryloyl group. It is possible to expect the effects of improving the dispersibility in a composition for forming an antireflection layer, improving the film strength, and preventing aggregation, and the like by using fired silica particles surface-modified with a compound having a (meth)acryloyl group. Reference may be made to the description in paragraph nos. [0119] to [0147] of Japanese Patent Laid-Open Publication No. 2007-298974 for specific examples and preferred examples of the surface treatment method.

Likewise in the fired silica particles, alumina particles are also preferably alumina particles surface-modified with a compound having a (meth)acryloyl group. The compound having a (meth)acryloyl group is preferably a silane coupling agent having a (meth)acryloyl group. Furthermore, the surface treatment is preferably a silane coupling treatment.

The alumina particles surface-modified with a compound having a (meth)acryloyl group are preferred because the alumina particles are used to crosslink the (meth)acryloyl group in the binder resin, and thus, the alumina particles are firmly fixed to the binder resin, and the pencil hardness of the resulting particle layer is more increased, so that it becomes more difficult for the alumina particles to fall off even during the folding. Reference may be made to the description in paragraph nos. [0119] to [0147] of Japanese Patent Laid-Open Publication No. 2007-298974 for specific examples and preferred examples of the surface treatment method.

As the metal oxide particles, commercially available particles may be used. Further, commercially available particles may be fired and used.

As a specific example thereof, it is possible to preferably use SNOWTEX MP-2040 (average primary particle diameter 200 nm, silica manufactured by Nissan Chemical Industries, LTD.), SEAHOSTAR KE-P10 (average primary particle diameter 150 nm, amorphous silica manufactured by NIPPON SHOKUBAI Co., Ltd.). SEAHOSTAR KE-P20 (average primary particle diameter 200 nm, amorphous silica manufactured by NIPPON SHOKUBAI Co., Ltd.), ASFP-20 (average primary particle diameter 200 nm, alumina manufactured by Nippon Denki Kagaku Kogyo K.K.), HIT-60A (average primary particle diameter 200 nm, high-purity alumina manufactured by Sumitomo Chemical Co., Ltd.), and the like. Further, as long as the requirements of the inorganic particles of the present invention are satisfied, commercially available particles may be used as they are.

The content ratio of the inorganic particles and a binder resin to be described below (mass of the inorganic particles/mass of the binder resin) is preferably 10/90 to 95/5, more preferably 20/80 to 90/10, and even more preferably 30/70 to 85/15.

When the (mass of the inorganic particles/mass of the binder resin) is 10/90 or more, the ratio is preferred because the reflectance is reduced as the ratio B/A of the unevenness shape of the moth eye structure is increased. When the (mass of the inorganic particles/mass of the binder resin) is 95/5 or less, the ratio is preferred because adhesion of the inorganic particles and the substrate is enhanced or it is difficult for the inorganic particles to be aggregated during the manufacturing process, and any failure or deterioration of haze is not caused.

An average value of the distances between the closest particles of the inorganic particles in the antireflection layer is preferably 30 nm or more, and more preferably 30 nm to 100 nm. When the average value of the distances between the closest particles of the inorganic particles is 30 nm or more, the value indicates that the inorganic particles are present without being extremely close to each other, and is preferred from the viewpoint of reduction in haze and reduction in reflectance. The distance between the closest inorganic particles is even more preferably 35 nm to 90 nm, and particularly preferably 40 nm to 85 nm.

(Binder Resin)

The binder resin of the antireflection layer will be described.

It is preferred that the binder resin of the antireflection layer includes a resin having a hydroxyl group. When the binder resin of the antireflection layer is a resin having a hydroxyl group, even the above-described metal oxide particles having an amount of hydroxyl groups on the surface of $1.00 \times 10^{-1}$ or less have high dispersibility, and metal oxide particles are not aggregated in the binder resin, so that haze of the antireflection layer may be lowered, and the reflectance may also be lowered.

The binder resin is preferably a resin obtained by polymerizing a polymerizable compound having at least one of a group having an ethylenically unsaturated double bond and an epoxy group, and preferably a resin obtained by polymerizing a polymerizable compound having only an ethylenically unsaturated double bond as a polymerizable group.

The hydroxyl group equivalent of one molecule of the polymerizable compound is preferably 1 to 10,000, more preferably 100 to 5,000, and even more preferably 200 to 3,000. The hydroxyl group equivalent in the present invention is a molecular weight per one hydroxyl group, and is a value obtained by dividing the molecular weight of the polymerizable compound by the number of hydroxyl groups included in one molecule.

Examples of the polymerizable compound having a group having an ethylenically unsaturated double bond include compounds having a (meth)acryloyl group, a vinyl group, a styryl group or an allyl group, and among them, a compound having a (meth)acryloyl group and $—C(O)OCH=CH_2$ is preferred, and a compound having a (meth)acryloyl group is more preferred.

Specific examples of the polymerizable compound include (meth) acrylic acid diesters of alkylene glycol, (meth)acrylic acid diesters of polyoxyalkylene glycol, (meth)acrylic acid diesters of alcohol, (meth)acrylic acid diesters of ethylene oxide or propylene oxide adduct, epoxy (meth)acrylates, urethane (meth)acrylates, polyester (meth) acrylates, and the like.

Among them, esters of an alcohol and a (meth)acrylic acid are preferred (for example, 2-hydroxyethyl methacrylate), and esters of (polyhydric) alcohol and (meth)acrylic acid are particularly preferred. Examples thereof include 2-hydroxyethyl acrylate (2-hydroxyethylmethacrylate)(hydroxyl group equivalent: 116), pentaerythritol triacrylate (hydroxyl group equivalent: 538), dipentaerythritol tetraacrylate (hydroxyl group equivalent: 228), dipentaerythritol pentaacrylate (hydroxyl group equivalent: 524), 2-hydroxyethyl methacrylate (2-hydroxyethylmethacrylate)(hydroxyl group equivalent: 130), pentaerythritol trimethacrylate (hydroxyl group equivalent: 340), dipentaerythritol tetramethacrylate (hydroxyl group equivalent: 256), dipentaerythritol pentamethacrylate (hydroxyl group equivalent: 594), and the like.

As the polymerizable compound, a commercially available compound may also be used. Specific examples thereof include NK ester 701A (manufactured by Shin-Nakamura Chemical Co., Ltd.)(hydroxyl group equivalent: 200), NK ester ACB-21 (manufactured by Shin-Nakamura Chemical Co., Ltd.)(hydroxyl group equivalent: 292), KAYARAD PET30 (manufactured by Nippon Kayaku Co., Ltd.)(hydroxyl group equivalent: 533), NK ester A-TMM3 (manufactured by Shin-Nakamura Chemical Co., Ltd.)(hydroxyl group equivalent: 897), KAYARAD DPHA (manufactured by Nippon Kayaku Co., Ltd.)(hydroxyl group equivalent: 1,102), ARONIX M-402 (manufactured by TOAGOSEI CO., LTD.) (hydroxyl group equivalent: 1,597), ARONIX M-405 (manufactured by TOAGOSEI CO., LTD.)(hydroxyl group equivalent: 3,799), ARONIX M-450 (manufactured by TOAGOSEI CO., LTD.)(hydroxyl group equivalent: 6,986), and the like.

Further, the compound is preferably a urethane compound from the viewpoint that the compound has a high effect of suppressing aggregation of particles, and good compatibility with a resin having a metal oxide particle or a hydroxyl group, and is more preferably a urethane(meth)acrylate having four or more functionalities from the viewpoint that the compound has excellent scratch resistance. Specific examples thereof include SHIKOH UV-1400B, SHIKOH UV-1700B, SHIKOH UV-6300B, SHIKOH UV-7550B, SHIKOH UV-7600B, SHIKOH UV-7605B, SHIKOH UV-7610B, SHIKOH UV-7620 EA, SHIKOH UV-7630B, SHIKOH UV-7640B, SHIKOH UV-6630B, SHIKOH UV-7000B, SHIKOH UV-7510B, SHIKOH UV-7461TE, SHIKOH UV-3000B, SHIKOH UV-3200B, SHIKOH UV-3210EA, SHIKOH UV-3310EA, SHIKOH UV-3310B, SHIKOH UV-3500BA, SHIKOH UV-3520TL, SHIKOH UV-3700B, SHIKOH UV-6100B, SHIKOH UV-6640B, SHIKOH UV-2000B, SHIKOH UV-2010B, SHIKOH UV-2250EA, SHIKOH UV-2750B (manufactured by The Nippon Synthetic Chemical Industry Co., Ltd.), UL-503LN (manufactured by KYOEISHA CHEMICAL Co., Ltd.), UNIDIC 17-806, UNIDIC 17-813, UNIDIC V-4030, UNIDIC V-4000BA (manufactured by DIC Corporation), EB-1290K, EB-220, EB-5129, EB-1830, EB-4858 (manufactured by Daicel-UCB Company, Ltd.), HI-COAP AU-2010, AU-2020 (manufactured by TOKUSHIKI Co., Ltd.), ARONIX M-1960 (manufactured by TOAGOSEI CO., LTD.), ARTRESIN UN-3320HA, UN-3320HC, UN-3320HS, UN-904 (manufactured by Negami Chemical Industrial Co., Ltd.), NK Oligo U-4HA, U-15HA (manufactured by Shin-Nakamura Chemical Co., Ltd.), and the like.

In addition, from the viewpoint of imparting flexibility, as the binder resin, any material may be used as long as the material does not depart from the spirit of the present invention, but a urethane-based polymer, a silicone-based polymer, a polyrotaxane-based polymer, a rubber-based polymer, an elastomer, and the like may be preferably used because the materials have excellent elasticity, and thus may impart softness. From the same viewpoint, the binder resin may be a material which is the same as the substrate. Furthermore, the binder resin may be a binder resin having a crosslinkable group which may be crosslinked by light or heat, and the like. Examples of the crosslinkable group include a group having an ethylenically unsaturated double bond, an epoxy group, a hydrolyzable silyl group, and the like. Hardness may be imparted even to a binder resin by having these groups, so that the scratch resistance may be enhanced. Provided that when the crosslinking density of the binder resin is excessively enhanced, the elasticity is reduced, and thus it is preferred to use the binder resin within the range not damaging the folding resistance.

Examples of a commercially available product having an ethylenically unsaturated double bond in a rubber-based polymer/oligomer include BAC-45 (polybutadiene terminal diacrylate, manufactured by OSAKA ORGANIC CHEMICAL INDUSTRY LTD.) or SPBDA-S30 (hydrogenated polybutadiene terminal diacrylate, manufactured by OSAKA ORGANIC CHEMICAL INDUSTRY LTD.).

Furthermore, in the binder resin, a crosslinkable monomer/oligomer may be used to be blended with the above-described polymer. Further, highly elastic particles and the like may be blended with the crosslinkable monomer/oligomer. As the crosslinkable monomer/oligomer, a urethane-based acrylate, a silicone-based acrylate, an alkylene oxide-modified acrylate and the like may be widely used. In addition, as the highly elastic particles, acrylic resin particles, rubber-based particles, and the like may be used. In particular, particles such as hybrid particles including a rubber-based polymer in the core thereof and an acrylic resin in the shell thereof are preferred due to excellent elasticity and compatibility. Examples of commercially available particles which are highly elastic include M-210 (average primary particle diameter 200 nm, copolymer (BA/St) of styrene (St) with shell: polymethylmethacrylate (MMA) and core: butyl acrylate (BA), manufactured by Kaneka Corporation), M-711 (average primary particle diameter 100 nm, copolymer (BD/St) of styrene with shell: MMA/BA and core: butadiene (BD), manufactured by Kaneka Corporation), M-732 (average primary particle diameter 60 nm, shell: MMA/BA/St, core: BD, manufactured by Kaneka Corporation), and the like.

A silane coupling agent having a polymerizable group may also be used due to excellent binding property with metal oxide particles, and a silane compound having a (meth)acryloxy group may be suitably used. Examples thereof include 3-(meth)acryloxypropyltrimethoxysilane, 3-(meth)acryloxypropylmethyldimethoxysilane, 3-(meth)acryloxypropyldimethylmethoxysilane, 3-(meth)acryloxypropylmethyldiethoxysilane, 3-(meth)acryloxypropyltriethoxysilane, 2-(meth)acryloxyethyltrimethoxysilane, 2-(meth)acryloxyethyltriethoxysilane, 4-(meth)acryloxybutyltrimethoxysilane, 4-(meth)acryloxybutyltriethoxysilane, and the like. Specifically, KBM-503, KBM-5103, X-40 (manufactured by Shin-Etsu Chemical Co., Ltd.), and the like may be used.

As the polymerizable compound, a plurality of compounds may be used in mixture. In this case, according to the blending ratio of the polymerizable compounds, an average molecular weight is used as a molecular weight, and a value obtained by dividing the molecular weight by average number of hydroxyl groups per molecule is used as the hydroxyl group equivalent.

(Substrate)

A substrate in the antireflection article of the present invention is not particularly limited, but a plastic substrate or a glass substrate is preferred.

As the plastic substrate, various plastic substrates may be used, and examples thereof include substrates containing a cellulose-based resin; a polyester resin such as cellulose acylate (triacetate cellulose, diacetyl cellulose, and acetate butylate cellulose); a (meth)acrylic resin such as polyethylene terephthalate, a polyurethane-based resin, polycarbonate, polystyrene, an olefin-based resin, and the like, a substrate containing cellulose acylate, polyethylene terephthalate, or a (meth)acrylic resin is preferred, and a substrate containing cellulose acylate is more preferred. As the cellulose acylate, the substrate described in Japanese Patent Laid-Open Publication No. 2012-093723, and the like may be preferably used.

The thickness of the plastic substrate is usually in a range of 10 μm to 1,000 μm, but is preferably 20 μm to 200 μm, and more preferably 25 μm to 100 μm from the viewpoint that the handleability is good, the light-transmittance is high, and a sufficient strength may be obtained. For the light-transmittance of the plastic substrate, a plastic substrate having a visible light transmittance (preferably an average transmittance of 400 nm to 750 nm) of 90% or more is preferred.

The antireflection article of the present invention is preferably an antireflection article including a substrate which is a film-type plastic substrate, and in this case, the antireflection article is a film-type antireflection article, that is, an antireflection film.

From the viewpoint of imparting flexibility, it is also preferred that the film-type substrate includes a polymer and a flexibilizing material which satisfies Equation (1) below.

$$N(10) \geq 1.1 \times N(0)$$ Equation (1)

Here, N (10) is the number of times of folding endurance measured by an MIT tester according to the JIS P8115 (2001) of a substrate including a flexibilizing material in an amount of 10 parts by mass based on 100 parts by mass of a polymer, and N(0) is the number of times of folding endurance of a substrate composed only of a polymer.

The film-type substrate may be manufactured by using a polymer which does not include a flexibilizing material, and a film-type substrate having a large number of times of folding endurance is preferred.

(Polymer)

As the polymer, a polymer having excellent optical transparency, mechanical strength, thermal stability, and the like is preferred, and the number of times of folding endurance measured by an MIT tester is preferably 500 times or more, and more preferably 1,000 times or more.

Examples of the polymer include a polycarbonate-based polymer, a polyester-based polymer such as polyethylene terephthalate (PET) or polyethylene naphthalate (PEN), an acrylic polymer such as polymethylmethacrylate (PMMA), a styrene-based polymer such as polystyrene or an acrylonitrile styrene copolymer (AS resin), and the like. Further, examples thereof also include a polyolefin-based polymer such as a polyolefin such as polyethylene and polypropylene, a norbornene-based resin, or an ethylene propylene copolymer, a vinyl chloride-based polymer, an amide-based polymer such as nylon or an aromatic polyamide, an imide-based polymer, a sulfone-based polymer, a polyethersulfone-based polymer, a polyetheretherketone-based polymer, a polyphenylene sulfide-based polymer, a vinylidene chloride-based polymer, a vinyl alcohol-based polymer, a vinyl butyral-based polymer, an arylate-based polymer, a polyoxymethylene-based polymer, an epoxy-based polymer, a cellulose-based polymer typified by triacetylcellulose, or a copolymer of the aforementioned polymers or a polymer in which the aforementioned polymers are mixed with each other.

In particular, since the above-described number of times of folding endurance is high and the hardness is also relatively high in an amide-based polymer such as an aromatic polyamide, the amide-based polymer may be preferably used as the film-type substrate of the present invention. For example, an aromatic polyamide as described in Example 1 of Japanese Patent No. 5699454 may also be preferably used in the present invention.

In addition, it is also possible to form cured layers of acrylic, urethane-based, acryl urethane-based, epoxy-based, and silicone-based UV curable resins, and heat curable resins in the film-type substrate.

The weight average molecular weight of the polymer is preferably 10,000 to 2,000,000, and more preferably 20,000 to 2,000,000 in order to secure the self-supporting characteristics.

The weight average molecular weight in the present invention is a value measured by gel permeation chromatography under the following conditions.

| [Solvent] | Tetrahydrofuran |
|---|---|
| [Device name] | TOSOH HLC-8220GPC |
| [Column] | use three TOSOH TSKgel Super HZM-H's (4.6 mm × 15 cm) in connection with each other. |
| [Column temperature] | 25° C. |
| [Sample concentration] | 0.1 mass % |
| [Flow rate] | 0.35 ml/min |
| [Calibration curve] | use a calibration curve by 7 samples in a TSK standard polystyrene having Mw = 2,800,000 to 1,050, manufactured by TOSOH Corporation. |

(Flexibilizing Material)

In the film-type substrate, a material (flexibilizing material) which further flexibilizes the aforementioned polymers may be used. As the flexibilizing material, a rubber elastic body, a brittleness improving agent, a plasticizer, a slide-ring polymer, and the like may be used. The flexibilizing material in the present invention improves the number of times of folding endurance of the polymer such that the number of times of folding endurance satisfies the above-described Equation (1).

(Rubber Elastic Body)

The present invention may include a rubber elastic body in order to impart flexibility to the film-type substrate. The rubber elastic body in the present invention refers to a material included in the definition of rubber in the JIS K6200 (2008), and simultaneously a material which satisfies the above-described Equation (1) when mixed with a polymer. In addition, the rubber elastic body alone has flexibility, and thus may be used as a substrate which is not mixed with polymer in the present invention.

Specific examples of a material for the rubber elastic body include styrene-butadiene rubber (SBR), butadiene rubber (BR), isoprene rubber (IR), isobutylene-isoprene rubber (IIR), chloroprene rubber (CR), ethylene-propylene rubber (EPM), ethylene-propylene-diene rubber (EPDM), acrylic rubber (ACM), urethane rubber (U), silicone rubber (Si, Q), fluorine rubber (FKM), nitrile rubber (NBR), synthetic natural rubber (IR), natural rubber (NR), and the like (letters in parentheses indicate the acronym by the ASTM). Furthermore, examples thereof include styrene-based, olefin-based, ester-based, urethane-based, amide-based thermoplastic elastomers, and the like. When all the materials are in the range which satisfies the above-described Equation (1), all the materials may be preferably used alone or in mixture with a polymer.

Further, as the characteristics of the material for a rubber elastic body and physical properties thereof, it is also possible to preferably use a rubber elastic body having a carbon-carbon double bond which forms no aromatic ring, or a rubber elastic body in the form of a core-shell particle, and a rubber elastic body crosslink-polymerized, which is defined as a rubber elastic body.

[Rubber Elastic Body Having Carbon-Carbon Double Bond which Forms No Aromatic Ring]

The term "carbon-carbon double bond which forms no aromatic ring" means excluding carbon-carbon double bonds included in an aromatic ring among the carbon-carbon double bonds. As the rubber elastic body, a rubber elastic body, which is a polymer, is preferred, a rubber elastic body having a carbon-carbon double bond which forms no aromatic ring in the main chain is more preferred, and a rubber elastic body containing a repeating unit represented by Formula (B) below is even more preferred.

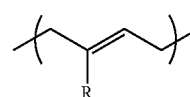

Formula (B)

In Formula (B), R represents a hydrogen atom or a methyl group.

R is preferably a hydrogen atom.

In the present invention, it is preferred that the rubber elastic body has a carbon-carbon double bond which forms no aromatic ring, and core-shell particles or a rubber polymer may be used.

<Core-Shell Particle>

In the present invention, core-shell particles may be used as the rubber elastic body. The core-shell particles have an alternating layer formed of two kinds of polymers (core and one shell) or two or more kinds of polymers (core and one or more shells) among various polymers. In these particles, each layer is composed of polymers having different glass transition temperatures (Tg). In the present specification, a polymer having a low glass transition temperature refers to a rubber phase to become a core, and a polymer having a high glass transition temperature refers to a hard phase to become a shell. This type of particle may be prepared by, for example, emulsion polymerization. The core-shell particles may be chemically cross-linked when one or more layers are prepared, such that the type and size of the core-shell particle are not changed during the blending.

Since the particle diameters are not changed by using crosslinking-type core-shell particles during the film formation, the particle diameters of the core-shell particles present in a film-type substrate are easily controlled.

An uncrosslinked base material which may be used for the crosslinked rubber phase is a polymer-based base material having a glass transition temperature of less than 0° C., preferably less than −20° C., and particularly preferably less than −40° C. A suitable polymer is essentially all the polymers which have this type of glass transition temperature and are suitable for the synthesis of core-shell particles.

The rubber phase glass transition temperatures may not be individually measured in many cases, and thus may be determined by preparing an emulsion polymer of monomer compositions associated, isolating the polymer, and subsequently measuring the glass transition temperature. Another method of measuring the rubber phase glass transition temperature is measuring dynamic mechanical characteristics of a new polymer blend and dynamic mechanical characteristics of a single matrix polymer. The maximum value of the dynamic loss curves (mechanical loss factor curves) may be considered as a measure of the glass transition temperature.

The rubber phase present in the core-shell particles suitable for the object of the present invention is present in an amount of 10 vol % to 90 vol %, preferably 20 vol % to 70 vol %, and particularly preferably 30 vol % to 60 vol % based on the total volume of the particles.

The hard phase present in the core-shell particles suitable for the object of the present invention is present in an amount of 90 vol % to 10 vol %, preferably 80 vol % to 30 vol %, and particularly preferably 70 vol % to 40 vol % based on the total volume of the particles.

The preparation of the core-shell particles is publicly known, and the details thereof are described in, for example, U.S. Pat. Nos. 3,833,682 and 3,787,522, German Patent Application Nos. DE-A-2116653, DE-A-2253689, DE-A-4132497, and DE-A-4040986, US Patent Application No. US-A-3,125,1904, and German Patent Application No. DE-A-3300526.

A polymer used as the rubber phase of the core-shell particles may be homopolymers or copolymers composed of two or more monomers.

The homopolymers or copolymers of the present specification may be derived from the following monomers:

conjugated diene monomers (for example, butadiene, isoprene, and chloroprene), monoethylenically unsaturated monomers, for example, alkyl and arylacrylates (provided that the alkyl group may be linear, cyclic, or branched, and the aryl group may have a substituent itself), alkyl and arylmethacrylates (provided that the alkyl group may be linear, cyclic, or branched, and the aryl group may have a substituent itself), substituted alkyl and arylmethacrylate and acrylates (provided that the substituent may be linear, cyclic, or branched, or a substituted alkyl group or a substituted aryl group), acrylonitrile and substituted acrylonitriles (for example, methacrylonitrile, α-methylene glutaronitrile, α-ethyl acrylontrile, and α-phenyl acrylonitrile), alkyl- and arylacrylamides and substituted alkyl- and arylacrylamides, vinyl ester and substituted vinyl esters, vinyl esters and substituted vinyl esters, vinyl amides and substituted vinyl amides, vinyl ketones and substituted vinyl ketones, halogenated vinyls and substituted halogenated vinyls, for example, olefins having one or more double bonds used for preparing olefinic rubber, particularly, ethylene, propylene, butylene and 1,4-hexadiene, and vinyl aromatic compounds (for example, styrene, α-methyl styrene, vinyl toluene, halostyrenes and tert-butylstyrenes).

In addition, a rubber phase, which adopts organopolysiloxanes represented by Formula (II) below as a base, may also be used for the preparation of core-shell particles.

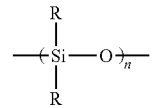

Formula (II)

In Formula (II), R is an alkyl or alkenyl group, an aryl group or a substituted hydrocarbon group having 1 to 10 carbon atoms, which are the same as or different from each other. Meanwhile, the alkyl and alkenyl group may be linear, branched, or cyclic.

It is also possible to use a rubber phase which adopts a fluorinated monoethylenically unsaturated compound, for example, tetrafluoroethylene, vinylidene fluoride, hexafluoropropene, chlorotrifluoroethylene and perfluoro (alkyl vinyl) ethers, and the like as a base.

The rubber phase may be crosslinked, and for the use of the rubber phase, it is also possible to prepare a polyfunctional unsaturated compound as described in German Patent Application No. DE-A-116653, U.S. Pat. No. 3,787,522, and European Patent Application No. EP-A-0436080. These publications also describe the use of grafting monomers (grafting-on monomers). These compounds may be additionally used to chemically crosslink the shell to the following phase, if desired.

In the present invention, when core-shell particles are used as the rubber elastic body, the rubbed phase forming the core is composed of a compound having a carbon-carbon double bond which forms no aromatic ring, and in particular, it is preferred that the rubber phase of the rubber elastic body is core-shell particles having repeating units derived from butadiene.

The polymer, which may be used as the hard phase of the core-shell particles, is homo- or copolymers. In the present specification, the copolymers may be composed of two or more monomers. The characteristic, which is common for suitable homo- and copolymers, is a glass transition temperature of 50° C. or more.

In the present specification, the homo- and copolymers may be derived from the following monomers: monoethylenically unsaturated compounds, for example, alkyl and arylacrylates (provided that the alkyl group may be linear, cyclic, or branched, and the aryl group may have a substituent itself), alkyl and arylmetharylates (provided that the alkyl group may be linear, cyclic, or branched, and the aryl group may have a substituent itself), substituted alkyl and arylmethacrylate and acrylates (provided that the substituent may be linear, cyclic, or a substituted alkyl group or a substituted aryl group), acrylonitrile and substituted acrylonitriles (for example, methacrylonitrile, α-methylene glutaronitrile, α-ethyl acrylonitrile, and α-phenyl acrylonitrile), alkyl- and arylacrylamides, vinyl ester and substituted vinyl esters, vinyl ethers and substituted vinyl ethers, vinyl amides and substituted vinyl amides, vinyl ketones and substituted vinyl ketones, halogenated vinyls and substituted halogenated vinyls, olefins (for example, ethylene, propylene, and butylene), cyclic olefins (for example, norbornene, tetracyclododecene, and 2-vinyl norbornene), fluorinated monoethylenically unsaturated compounds, for example, tetrafluoroethylene, vinylidene fluoride, hexafluoropropene, chlorotrifluoroethylene and perfluoro (alkyl vinyl) ethers, and a vinyl aromatic compound represented by Formula (III) below.

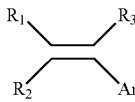

Formula (III)

In Formula (III), $R_1$, $R_2$, and $R_3$ may be the same as or different from each other, and are hydrogen or a linear, branched or cyclic alkyl group, and Ar is a $C_6$ to $C_{18}$ aromatic group which may have an additional substituent, for example, an alkyl or halogen group, and the like.

The hard phase may be crosslinked, and for the present purpose, it is also possible to prepare a polyfunctional unsaturated compound as described in German Patent Application No. DE-A-2116653, U.S. Pat. No. 3,787,522, and European Patent Application No. EP-A-0436080. These publications also describe the use of grafting monomers. These compounds may be additionally used to chemically crosslink the shell to the following phase, if desired.

The polymer, which is an uncrossed base material, has a glass transition temperature of 50° C. or more, preferably 80° C. or more, and particularly preferably 100° C. or more.

As the rubber elastic body, it is possible to use commercially available core-shell particles, for example, Staphyloid grades from TAKEDA Chem. Industries, described, for example, in Japanese Patent No. 17514 or 129266, Kane-Ace grades from KANEKA, described in the Knae ACE-B product brochure, Metablen C, Metablen W and Metablen E grades from METABLEN Company BV, described in the Metablen product brochure, Blendex grades manufactured by GE PLASTICS or Paraloid grades manufactured by ROHM and HAAS, described, for example, in Gachter/Muller Kunststoff-Additive [Plastics Additives], Carl Hanser, Munich (1983) pages XXIX et seq. or in the PARALOID BTA733 brochure, Impact Modifiers for Clear Packaging (1987) from Rohm and Haas or in the PARALOID BTA-III N2 BTA-702 BTA 715 brochure (1989) from Rohm and HaasCarl Hanser.

Meanwhile, it is preferred that as the form of the core-shell particles, core-shell particles (MBS) adopting butadiene as a core and at least one of styrene and methylmethacrylate (more preferably, the ratio of styrene is 10 mol % or more, and even more preferably 30 mol % or more) as a shell are used.

When core-shell particles are used as the rubber elastic body, the content of the core-shell particles is 2.5 mass % to 50 mass %, preferably 5 mass % to 40 mass %, and more preferably 10 mass % to 25 mass % based on the total mass of layer B. When the content of the core-shell particles is 2.5 mass % or more, the adhesion between the film and the polarizer may be improved, and when the content is 50 mass % or less, a haze of the film, particularly, an internal haze of the film is low.

<Rubber Elastic Body>

In the present invention, a rubber polymer may be used as the rubber elastic body. The rubber polymer is a polymer having a glass transition temperature of 40° C. or less. A rubber or thermoplastic elastomer is included in the rubber polymer. In the case where are two or more glass transition temperatures as in block copolymers, the polymer may be used when the lowest glass transition temperature is 40° C. or less. The Mooney viscosity (ML1+4,100° C.) of the rubber polymer is appropriately selected, and is usually 5 to 300.

Examples of the rubber polymer include a diene-based rubber such as a random copolymer of polybutadiene, polyisoprene, and styrene with butadiene or isoprene, an acrylonitrile-butadiene copolymer, a butadiene-isoprene copolymer, a butadiene-(meth)acrylic acid alkyl ester-acrylonitrile copolymer, and a butadiene-(meth)acrylic acid alkyl ester-acrylonitrile-styrene copolymer; a butylene-isoprene copolymer; an aromatic vinyl-conjugated diene-based block copolymer such as a styrene-butadiene block copolymer, a hydrogenated styrene-butadiene block copolymer, a hydrogenated styrene-butadiene random copolymer, a styrene-isoprene block copolymer, and a hydrogenated styrene-isoprene block copolymer, a low crystalline polybutadiene resin, and the like.

Meanwhile, it is preferred that as the rubber polymer, a styrene-butadiene-styrene block copolymer (SBS) is used.

The particle diameter of the rubber elastic body is preferably 10 nm to 500 nm, more preferably 50 nm to 300 nm, and even more preferably 50 nm to 100 nm.

When the particle diameter of the rubber elastic body is 10 nm or more, the adhesion between the film and the polarizer is excellent, and when the particle diameter is 500 nm or less, a haze of the film, particularly, an internal haze of the film is low.

The weight average molecular weight of the rubber elastic body is preferably 50,000 to 200,000, more preferably 50,000 to 150,000, and even more preferably 50,000 to 100,000. When the weight average molecular weight of the rubber elastic body is 50,000 or more, adhesion with the polarizer is excellent, and when the weight average molecular weight is 200,000 or less, the haze is low.

The weight average molecular weight of the rubber elastic body refers to a weight average molecular weight measured by a gel permeation chromatography (GPC) method under the above-described conditions.

(Brittleness Improving Agent)

The present invention may include a brittleness improving agent in order to impart flexibility to the film-type substrate. Examples of the brittleness improving agent include improving the following compounds.

The brittleness improving agent in the present invention is preferably a compound having a repeating unit. Examples of the compound having a repeating unit include a condensate or an adduct, and preferred examples of the condensate include a condensate of polyhydric alcohol and polybasic acid, a condensate of polyhydric ether alcohol and polybasic acid, and a condensate of a condensate of polyhydric alcohol and polybasic acid and an isocyanate compound, and preferred examples of the adduct include an adduct of acrylic acid ester and an adduct of methacrylic acid ester. Furthermore, it is also possible to use a polyether-based compound, a polyurethane-based compound, a polyether polyurethane-based compound, a polyamide-based compound, a polysulfone-based compound, a polysulfonamide-based compound, and at least one compound having a number average molecular weight of 600 or more, selected among the other polymer-based compounds to be described below.

At least one of the compounds is preferably a condensate of polyhydric alcohol and polybasic acid, a condensate of polyhydric ether alcohol and polybasic acid, an adduct of acrylic acid ester or an adduct of methacrylic acid ester, more preferably a condensate of polyhydric alcohol and polybasic acid or an adduct of acrylic acid ester, and even more preferably a condensate of polyhydric alcohol and polybasic acid.

Hereinafter, each kind of the condensate of polyhydric alcohol and polybasic acid and the adduct of acrylic acid ester, which are compounds having a repeating unit preferably used in the present invention, will be described.

(1) Condensate of Polyhydric Alcohol and Polybasic Acid

First, a condensate of polyhydric alcohol and polybasic acid, which is used in a film-type substrate, will be described. A preferred condensate of polyhydric alcohol and polybasic acid is not particularly limited, but it is preferred that the preferred condensate is obtained by a reaction of dibasic acid and glycol. Both ends of the reactant obtained by the reaction of dibasic acid and glycol may be a reactant as it is, but when a so-called terminal blocking is performed by additionally reacting monocarboxylic acid or monoalcohol with the reactant, a change in Retardation when maintained under a moist and humid environment may be suppressed, so that the reactant is preferred. When compared with a condensate having unblocked terminals, the aforementioned condensate has a lower hydroxyl value, and thus a condensate having a hydroxyl value of less than 40 mgKOH/g is preferred, a condensate having a hydroxyl value of 20 mgKOH/g or less is more preferred, and a condensate having a hydroxyl value of 10 mgKOH/g or less is even more preferred. It is preferred that the condensate of polyhydric alcohol and polybasic acid, which is used in the present invention, is synthesized by a glycol having 3 to 12 carbon atoms and a dibasic acid having 5 to 12 carbon atoms.

In the film-type substrate, as the dibasic acid used in the condensate of polyhydric alcohol and polybasic acid, an aliphatic dicarboxylic acid residue or alicyclic dicarboxylic acid residue having 5 to 12 carbon atoms, or an aromatic dicarboxylic acid residue having 8 to 12 carbon atoms is preferred. Further, as the glycol, an aliphatic or alicyclic glycol residue having 3 to 12 carbon atoms and an aromatic glycol residue having 6 to 12 carbon atoms are preferred. Hereinafter, dibasic acid and glycol, which may be preferably used for the synthesis of the condensate of polyhydric alcohol and polybasic acid in the present invention, will be described.

As the dibasic acid, any one of an aliphatic dicarboxylic acid and an aromatic dicarboxylic acid may be used.

Examples of the aliphatic dicarboxylic acid include oxalic acid, malonic acid, succinic acid, maleic acid, fumaric acid, glutaric acid, adipic acid, suberic acid, azelaic acid, cyclohexanedicarboxylic acid, sebacic acid, dodecanedicarboxylic acid, and the like. Among them, an aliphatic dicarboxylic acid including adipic acid, suberic acid, azelaic acid, and sebacic acid is preferred from the viewpoint of improving brittleness.

Examples of the aromatic dicarboxylic acid include phthalic acid, terephthalic acid, isophthalic acid, 1,5-naphthalenedicarboxylic acid, 1,4-naphthalenedicarboxylic acid, and the like. Among them, phthalic acid and terephthalic acid are preferred, and terephthalic acid is particularly preferred.

The number of carbon atoms of the dibasic acid used in the present invention is preferably 5 to 12, more preferably 6 to 10, and particularly preferably 6 to 8. In the present invention, a mixture of two or more dibasic acids may be used, and in this case, a mixture of two or more dibasic acids having an average number of carbon atoms in the aforementioned range is preferred. It is also preferred that an aliphatic dicarboxylic acid and an aromatic dicarboxylic acid are used in combination. Specifically, the combination of adipic acid and phthalic acid, the combination of adipic acid and terephthalic acid, the combination of succinic acid and phthalic acid, and the combination of succinic acid and terephthalic acid are preferred, and the combination of succinic acid and phthalic acid and the combination of succinic acid and terephthalic acid are more preferred. When an aliphatic dicarboxylic acid and an aromatic dicarboxylic acid are used in combination, the ratio (molar ratio) of both the dicarboxylic acids is not particularly limited, but is preferably 95:5 to 40:60, and more preferably 55:45 to 45:55.

In the film-type substrate, examples of the glycol (diol) used in the condensate of polyhydric alcohol and polybasic acid include an aliphatic diol and an aromatic diol, and an aliphatic diol is preferred.

Examples of the aliphatic diol include alkyl diol or alicyclic diols, and examples thereof include ethylene glycol (ethanediol), 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 1,4-cyclohexanediol, 1,4-cyclohexanedimethanol, 2,2,4-trimethyl-1,3-pentanediol, 2-ethyl-1,3-hexanediol, 2-methyl-1,8-octanediol, 1,9-nonanediol, 1,10-decanediol, diethylene glycol, and the like.

The aliphatic diol is preferably at least one of 1,4-butanediol, 1,5-pentanediol, and 1,6-hexanediol, and particularly preferably at least one of 1,4-butanediol and 1,2-propanediol. When two aliphatic diols are used, it is preferred that ethylene glycol and 1,5-pentanediol are used.

The number of carbon atoms of the glycol is preferably 3 to 12, more preferably 4 to 10, and particularly preferably 4 to 8. When two or more glycols are used, it is preferred that the average number of carbon atoms of the two or more glycols is in the aforementioned range.

In addition, in the film-type substrate, it is preferred that both terminals of the condensate of polyhydric alcohol and polybasic acid are protected by a monoalcohol residue or a monocarboxylic acid residue.

In that case, as the monoalcohol residue, a substituted or unsubstituted monoalcohol residue having 1 to 30 carbon atoms is preferred, and examples thereof include aliphatic alcohols such as methanol, ethanol, propanol, isopropanol, butanol, isobutanol, pentanol, isopentanol, hexanol, isohexanol, cyclohexylalcohol, octanol, isooctanol, 2-ethylhexyl alcohol, nonyl alcohol, isononyl alcohol, tert-nonyl alcohol, decanol, dodecanol, dodecahexanol, dodecaoctanol, allyl alcohol, and oleyl alcohol, substituted alcohols such as benzyl alcohol and 3-phenylpropanol, and the like.

Furthermore, in blocking with a monocarboxylic acid residue, the monocarboxylic acid used as the monocarboxylic acid residue is preferably a substituted or unsubstituted monocarboxylic acid having 1 to 30 carbon atoms. These monocarboxylic acids may be an aliphatic monocarboxylic acid or an aromatic monocarboxylic acid. First, when preferred aliphatic monocarboxylic acids are described, examples thereof include acetic acid, propionic acid, butanoic acid, caprylic acid, caproic acid, decanoic acid, dodecanoic acid, stearic acid, and oleic acid, and examples of the aromatic monocarboxylic acids include benzoic acid, p-tert-butylbenzoic acid, orthotoluic acid, metatoluic acid, paratoluic acid, dimethylbenzoic acid, ethylbenzoic acid, normal-propylbenzoic acid, aminobenzoic acid, acetoxybenzoic acid, and the like, and these may be used either alone or in mixture of two or more thereof.

In this case, when the monocarboxylic acid residue at both terminals thereof has 3 carbon atoms or less, the volatility is reduced, so that weight loss caused by heating a condensate of polyhydric alcohol and polybasic acid is not increased, and it is possible to reduce the occurrence of process contamination or the occurrence of surface failure. From this viewpoint, as monocarboxylic acids used for blocking, an aliphatic monocarboxylic acid is preferred. An aliphatic monocarboxylic acid in which the monocarboxylic acid has 2 to 22 carbon atoms is more preferred, an aliphatic monocarboxylic acid having 2 and 3 carbon atoms is more preferred, and an aliphatic monocarboxylic acid residue having 2 carbon atoms is particularly preferred. For example, acetic acid, propionic acid, butanoic acid, benzoic acid, derivatives thereof and the like are preferred, acetic acid or propionic acid is more preferred, and acetic acid (the terminal becomes an acetyl group) is most preferred. Two or more monocarboxylic acids used for blocking may be mixed.

Meanwhile, when both terminals of the condensate of polyhydric alcohol and polybasic acid are not blocked, the condensate is preferably polyester polyol.

As described above, specifically preferred examples of the condensate of polyhydric alcohol and polybasic acid include poly(ethylene glycol/adipic acid) ester, poly(propylene glycol/adipic acid) ester, poly(1,3-butanediol/adipic acid) ester, poly(propylene glycol/sebacic acid) ester, poly(1,3-butanediol/sebacic acid) ester, poly(1,6-hexanediol/adipic acid) ester, poly(propylene glycol/phthalic acid) ester, poly(1,3-butanediol/phthalic acid) ester, poly(propylene glycol/terephthalic acid) ester, poly(propylene glycol/1,5-naphthalenedicarboxylic acid) ester, poly(propylene glycol/terephthalic acid) ester with both terminals thereof esterified with 2-ethyl-hexyl alcohol, poly(propylene glycol/adipic acid) ester with both terminals thereof esterified with 2-ethyl-hexyl alcohol, acetylated poly(butanediol/adipic acid) ester, and the like.

The condensate of polyhydric alcohol and polybasic acid may be easily synthesized by a typical method, and any method of a hot-melt condensation method by (poly)esterification reaction or transesterification reaction between the dibasic acid or alkyl esters thereof and the glycols, or interfacial condensation method between acid chloride and glycols of these acids. With respect to the condensates of polyhydric alcohol/polybasic acid, there is a detailed description in "Plasticizer—Theory and Applications" edited by Kouichi Mural (SAIWAI SHOBO CO., LTD., first edition published on Mach 1, 1973). Further, it is also possible to use materials described in Japanese Patent Laid-Open Publication Nos. H05-155809, 05-155810, and 5-197073, No. 2006-259494, No. H07-330670, and Nos. 2006-342227 and 2007-003679.

In addition, as a commercially available product, it is possible to use ADK CIZER (there are many products as ADK CIZER P series and ADK CIZER PN series) described in DIARY 2007, page 55 to page 27 as a condensate of polyhydric alcohol and polybasic acid by ADEKA Corporation, and it is also possible to use various products of polylite described in "Polymer-related Commodity List (2007)" by DIC Corporation, page 25, or various products of POLYCIZER described in "polymer modifiers of DIC" by DIC Corporation (Apr. 1, 2004. 000VIII issue), page 2 to page 5. Furthermore, the commercially available product may be purchased as a Plasthall P series manufactured by US CPHALL Co., Ltd. Benzoyl functionalized polyethers are sold commercially under the trade name of BENZOFLEX from Velsicol Chemicals, Rosemont, Ill. (for example, BENZOFLEX400, polypropylene glycol dibenzoate).

(2) Adduct of Acrylic Acid Ester

The composition of the adduct of acrylic acid ester includes preferably an aliphatic acrylic acid ester monomer, an acrylic acid ester monomer including an aromatic ring, or an acrylic acid ester monomer including a cyclohexyl group, as a main component, and more preferably an aliphatic acrylic acid ester monomer as a main component. The main component refers to a component having a higher structural mass ratio than any other copolymerizable components in a (co)polymer.

The structural mass ratio of these components is preferably 40 mass % to 100 mass %, more preferably 60 mass % to 100 mass %, and most preferably 70 mass % to 100 mass %.

Examples of the aliphatic acrylic acid ester monomer include methyl acrylate, ethyl acrylate, propyl acrylate (i-, n-), butyl acrylate (n-, i-, s-, t-), pentyl acrylate (n-, i-, s-), hexyl acrylate (n-, i-), heptyl acrylate (n-, i-), octyl acrylate (n-, i-), nonyl acrylate (n-, i-), myristyl acrylate (n-, i-), lauryl acrylate, (2-ethylhexyl) acrylate, ($\epsilon$-caprolactone) acrylate, (2-hydroxyethyl) acrylate, (2-hydroxypropyl) acrylate, (3-hydroxypropyl) acrylate, (4-hydroxybutyl) acrylate, (2-hydroxybutyl) acrylate, (2-methoxyethyl) acrylate, (2-ethoxyethyl) acrylate, (2-ethylhexyl) acrylate, and the like. Among them, butyl acrylate and (2-ethylhexyl) acrylate are preferred Examples of the acrylic acid ester monomer including an aromatic ring include phenyl acrylate, (2- or 4-chlorophenyl) acrylate, (2-, 3- or 4-ethoxycarbonylphenyl) acrylate, (o-, m- or p-tolyl) acrylate, benzyl acrylate, phenethyl acrylate, phenethyl methacrylate, (2-naphthyl)acrylate, and the like, but benzyl acrylate and phenethyl acrylate may be preferably used.

Examples of the acrylic acid ester monomer including a cyclohexyl group include cyclohexyl acrylate, (4-methylcyclohexyl) acrylate, (4-ethylcyclohexyl) acrylate, and the like, but cyclohexyl acrylate may be preferably used.

Examples of an additionally polymerizable component in addition to the monomer include $\alpha,\beta$-unsaturated acid such as acrylic acid and methacrylic acid, an unsaturated group-containing divalent carboxylic acid such as maleic acid, fumaric acid, and itaconic acid, aromatic vinyl compounds such as styrene and $\alpha$-methylstyrene, $\alpha,\beta$-unsaturated nitrile such as acrylonitrile and methacrylonitrile, maleic anhydride, maleimide, N-substituted maleimide, glutaric acid anhydride, and the like, and these components may be used either alone or in combination of two or more monomers as a copolymerization component.

In order to synthesize an adduct having a weight average molecular weight of 10,000 or less as an adduct of acrylic acid ester, it is difficult to control the molecular weight in the typical polymerization. Examples of a method of polymerizing a low molecular weight polymer include a method using a peroxide polymerization initiator such as cumene peroxide or t-butyl hydroperoxide, a method using a larger amount of polymerization initiator than the amount in the typical polymerization, a method using a chain transfer agent such as a mercapto compound or carbon tetrachloride in addition to the polymerization initiator, a method using a polymerization terminator such as benzoquinone or dinitrobenzene in addition to the polymerization initiator, and a method as described in Japanese Patent Laid-Open Publication No. 2000 128911 or 2000-344823 in which bulk polymerization is carried out using a polymerization catalyst of a compound having one thiol group and a secondary hydroxyl group, or a combination of the aforementioned compound and an organic metal compound, and the like, and any of the aforementioned methods may be preferably used in the present invention, but particularly, the method described in the publication is preferred.

The condensate of polyhydric alcohol and polybasic acid or the adduct of acrylic acid ester, and the like and brittleness improving agents thereof may be used either alone or in mixture of two or more thereof.

The weight average molecular weight (Mw) of the brittleness improving agent used in the present invention is preferably 500 to 5,000, more preferably in a range of 700 to 4,000, and even more preferably in a range of 800 to 3,000. When the molecular weight is 500 or more, the volatility from a film during or after the formation of the film is not easily problematic, and when the molecular weight is 5,000 or less, compatibility with the polymer used in the present invention is improved, so that transparency may be maintained.

(Plasticizer)

The present invention may include a plasticizer in order to impart flexibility to the film-type substrate.

Examples of a plasticizer preferably added include low molecular weight to oligomer compounds having a molecular weight of about 190 to 5,000 within the range of the aforementioned physical properties, and for example, phosphoric acid ester, carboxylic acid ester, polyolester, and the like are used.

Examples of phosphoric acid ester include triphenyl phosphate (TPP), tricresyl phosphate, cresyl diphenyl phosphate, octyl diphenyl phosphate, biphenyl diphenyl phosphate, trioctyl phosphate, tributyl phosphate, and the like. Triphenyl phosphate and biphenyl diphenyl phosphate are preferred.

As the carboxylic acid ester, phthalic acid ester and citric acid ester are representative. Examples of the phthalic acid ester include dimethyl phthalate, diethyl phthalate, dibutyl phthalate, dioctyl phthalate, diphenyl phthalate, diethylhexyl phthalate, and the like. Examples of the citric acid ester include triethyl O-acetyl citrate, tributyl O-acetyl citrate, acetyl triethyl citrate, acetyl tributyl citrate, and the like.

These preferred plasticizers except for TPP (melting temperature: about 50° C.) are liquids at 25° C., and the boiling temperature is also 250° C. or more.

Examples of other carboxylic acid esters include butyl oleate, methylacetyl ricinoleate, dibutyl sebacate, and various trimellitic acid esters. Examples of the glycolic ester include triacetin, tributyrin, butyl phthalyl butyl glycolate, ethyl phthalyl ethyl glycolate, methyl phthalyl ethyl glycolate, butyl phthalyl butyl glycolate, methyl phthalyl methyl glycolate, propyl phthalyl propyl glycolate, butyl phthalyl butyl glycolate, octyl phthalyl octyl glycolate, and the like.

Further, plasticizers described in Japanese Patent Laid-Open Publication Nos. H5-194788, S60-250053, H4-227941, H06-16869, H5-271471, H07-286068, H5-5047, H11-80381, H07-20317, H08-57879, H10-152568, and H10-120824, and the like are also preferably used. According to these publications, there are many preferred descriptions concerning the utilizing methods and characteristics of plasticizers, in addition to the examples of plasticizers, and these may also be preferably used in the present invention.

As other plasticizers, (di)pentaerythritol esters described in Japanese Patent Laid-Open Publication No. H11-124445, glycerol esters described in Japanese Patent Laid-Open Publication No. H11-246704, diglycerol esters described in Japanese Patent Laid-Open Publication No. 2000-63560, citric acid esters described in Japanese Patent Laid-Open Publication No. H11-92574, substituted phenyl phosphoric acid esters described in Japanese Patent Laid-Open Publication No. H11-90946, ester compounds containing an aromatic ring and a cyclohexane ring described in Japanese Patent Laid-Open Publication No. 2003-165868, and the like are preferably used.

In addition, polymer plasticizers including a resin component having a molecular weight of 1,000 to 100,000 are also preferably used. Examples thereof include polyesters and polyethers described in Japanese Patent Laid-Open Publication No. 2002-22956, polyester ethers, polyester urethanes or polyesters described in Japanese Patent Laid-Open Publication No. H5-197073, copolyester ethers described in Japanese Patent Laid-Open Publication No. H2-292342, epoxy resins or novolak resins described in Japanese Patent Laid-Open Publication No. 2002-146044, and the like.

Furthermore, as a plasticizer which is excellent in terms of volatility resistance, bleed-out, low haze, and the like, it is preferred to use the polyester diol described, for example, in Japanese Patent Laid-Open Publication No. 2009-98674, in which both terminals are a hydroxyl group. Further, as a plasticizer which is excellent in terms of planarity or low haze of a film-type substrate, and the like, the sugar ester derivatives described in WO2009/031464 are also preferred.

These plasticizers may be used either alone or in mixture of two or more thereof.

In the present invention, a slide-ring polymer may also be preferably used in order to impart flexibility to a film-type substrate.

For the aforementioned flexibilizing material, a flexibilizing material may be mixed alone with a polymer, a plurality of flexibilizing materials may be appropriately mixed in combination, and a film-type substrate may be formed by using only a flexibilizing material alone or in combination of a plurality thereof without being mixed with a resin.

The amount of these flexibilizing materials mixed is not particularly limited, as long as Equation (1) is satisfied when 10 parts by mass of the flexibilizing material is mixed with 100 parts by mass of the polymer. That is, a polymer having a sufficient number of times of folding endurance may be used as the film-type substrate, the flexibilizing material may be mixed with the polymer in the range which satisfies the above-described Equation (1), and a sufficient number of times of folding endurance may be obtained by using the flexibilizing material (100%) throughout the film-type substrate.

(Other Additives)

It is possible to add various additives (for example, a UV absorber, a matting agent, an antioxidant, a peeling promoter, a retardation (optical anisotropy) controlling agent, and the like) to the film-type substrate. These additives may be solids and oils. That is, the melting temperature or boiling temperature thereof is not particularly limited. For example, ultraviolet absorption materials may be mixed at 20° C. or less and 20° C. or less, or deterioration inhibitors may be equally mixed, and the like. In addition, with respect to the time for the addition, the additive may be added anywhere in the process of manufacturing a film-type substrate, and a process of preparing a material may be further performed by adding the additives to the material preparation process.

Furthermore, the amount of each material added is not particularly limited as long as the function is exhibited.

Hereinafter, each additive will be described.

(UV Absorber)

Examples of a UV absorber include benzotriazole-based, 2-hydroxybenzophenone-based, or salicylic acid phenyl ester-based UV absorbers, and the like. Examples thereof include triazoles such as 2-(5-methyl-2-hydroxyphenyl)benzotriazole, 2-[2-hydroxy-3,5-bis(α,α-dimethylbenzyl)phenyl]-2H-benzotriazole, and 2-(3,5-di-t-butyl-2-hydroxyphenyl)benzotriazole, and benzophenones such as 2-hydroxy-4-methoxybenzophenone, 2-hydroxy-4-octoxybenzophenone, and 2,2'-dihydroxy-4-methoxybenzophenone.

(Matting Agent)

It is preferred that the film-type substrate contains a matting agent from the viewpoint of the film sliding properties and the stable preparation. The matting agent may be a matting agent of an inorganic compound or a matting agent of an organic compound.

As a specific preferred example of the matting agent of the inorganic material, an inorganic compound including silicon (for example, silicon dioxide, fired calcium silicate, hydrated calcium silicate, aluminum silicate, magnesium silicate, and the like), titanium oxide, zinc oxide, aluminum oxide, barium oxide, zirconium oxide, strontium oxide, antimony oxide, tin oxide, tin oxide•antimony, calcium carbonate, talc, clay, fired kaolin, calcium phosphate, and the like are preferred, and an inorganic compound including silicon or zirconium oxide is more preferred, but silicon oxide is particularly preferably used because silicon oxide may reduce the turbidity of the cellulose acylate film. As the silicon dioxide particles, it is possible to use a commercially available product under the trade name such as, for example, AEROSIL R972, R974, R812, 200, 300, R202, OX50, and TT600 (all manufactured by NIPPON AEROSIL CO., LTD.). As the zirconium oxide particles, it is possible to use a commercially available product under the trade name such as, for example, AEROSIL R976 and R811 (all manufactured by NIPPON AEROSIL CO., LTD.).

As a specific preferred example of the matting agent of the organic compound, for example, a silicone resin, an acrylic resin, and the like are preferred. Among the silicone resins, those having a three-dimensional network structure are preferred, and it is possible to use a commercially available product under the trade name such as, for example, TOSPEARL 103, TOSPEARL 105, TOSPEARL 108, TOSPEARL 120, TOSPEARL 145, TOSPEARL 3120, and TOSPEARL L240 (all manufactured by Toshiba Silicones Co., Ltd.).

When these matting agents are added to a cyclic olefin-based resin solution, the method thereof is not particularly limited, and does not matter as long as a desired cyclic olefin-based resin solution may be obtained by any method. For example, an additive may be contained in the step of mixing a cyclic olefin-based resin with a solvent, or the additive may be added after the cyclic olefin-based resin and the solvent were mixed to produce a mixed solution. Furthermore, the additive may be added and mixed immediately before a dope is cast, and the method is a so-called just-in-time addition method, and the mixing is used by providing a screw-type kneading on line. Specifically, a static mixer such as an in-line mixer is preferred, and as the in-line mixer, an in-line mixer such as a static mixer SWJ (Toray static in-tube mixer Hi-Mixer) (manufactured by Toray Engineering Co., Ltd.) is preferred. Meanwhile, with respect to the in-line addition, Japanese Patent Laid-Open Publication No. 2003-053752 describes an invention of removing concentration unevenness and aggregation of matting particles in a method of manufacturing a cyclic olefin-based resin film, in which the distance L between the end of an addition nozzle through which an addition solution with a different composition is added to a main raw material dope, and a starting end of the in-line mixer is set to 5 times or less the inner diameter of a pipe for feeding a main raw material. As a more preferred aspect, it is described that the distance L between the end opening of a feeding nozzle through which an addition solution with a different composition to the main raw material dope, and the starting end of the in-line mixer is set to 10 times or less the inner diameter d of the end opening of the feeding nozzle, and the in-line mixer is a static non-agitation-type in-tube mixer or a dynamic agitation-type in-tube mixer. More specifically, it is disclosed that the ratio of flow rate of a main raw material dope of the cellulose acylate film/the in-line addition solution) is 10/1 to 500/1, and preferably 50/1 to 200/1. Further, Japanese Patent Laid-Open Publication No. 2003-014933, which is an invention directed to a retardation film which is low in bleed-out of additives, free from inter-layer peeling, good in slippage, and excellent in transparency, describes that as a method of adding an additive, the additive may be added to a dissolving pot, an additive or a solution having the additive dissolved or dispersed therein may be added to the dope being fed from the dissolving pot to a co-casting die, but in the latter case, a mixing unit such as static mixer is preferably provided in order to enhance mixing performance.

(Antioxidant)

An antioxidant may be suitably added as long as the antioxidant is a compound which prevents oxidation or degradation and thermal decomposition or thermal coloration when a resin used in a film-type substrate is molded in the form of a film or used. It is possible to expect the effect by adding an antioxidant which is each suitable as a mechanism of action, which captures or decomposes alkyl radical or peroxide radical produced by the oxidation of resins. For example, IRGANOX-1010 and IRGANOX-1076 manufactured by BASF, SUMILIZER GM and SUMILIZER GS manufactured by Sumitomo Chemical Co., Ltd., and the like may be exemplified.

(Retardation Adjusting Agent)

A retardation adjusting agent may be added to the film-type substrate. As a retardation adjusting agent in the present invention, it is possible to preferably use any one of a retardation adjusting agent which develops retardation (hereinafter, referred to as a retardation developer) and a retardation adjusting agent which decreases retardation (hereinafter, referred to as a retardation decreasing agent).

The aforementioned additives may be used either alone or in combination of two or more thereof.

It is preferred that the film-type substrate has a small difference in refractive index between a flexibilizing material or various additives, which is(are) used in the substrate and a polymer from the viewpoint of transparency.

(Film Formation Method)

The film-type substrate is characterized to include a particle layer and a substrate, and the particle layer and the substrate may be each individually manufactured and simultaneously manufactured, and are not limited to any manufacturing method. For example, a particle layer may be subsequently manufactured on a substrate prepared in advance by any unit such as coating or lamination, and the particle layer and the substrate may be simultaneously manufactured by a unit for forming a film, such as an extruder.

(Manufacturing Method of Substrate)

A substrate used for the film-type substrate may be film-formed by hot-melting a thermoplastic polymer, and may be film-formed by a liquid film forming (solvent cast method) from a solution having a polymer uniformly dissolved therein. In the case of a hot-melt film formation, the above-described flexibilizing material or various additives may be added during the hot-melt film formation. Meanwhile, when the substrate used for the film-type substrate is adjusted by a solution, the flexibilizing material or various additives described above in each preparation process may be added to a polymer solution (hereinafter, also referred to as a dope). In addition, with respect to the time for the addition, the additive may be added anywhere in the process a dope, but a process of preparing a dope may be further performed by adding the additive to the final dope preparation process.

(Thickness of Substrate)

It is preferred that the film-type substrate has a thickness of 1,000 μm or less.

(Surface Treatment)

It is possible to improve the adhesion and adhesiveness of the film-type substrate with a layer other than the film (for example, a polarizer, an undercoat layer, and a back layer), or other substrates by performing a surface treatment in some cases. For example, a glow discharge treatment, a UV irradiation treatment, a corona treatment, a flame treatment, and an acid or alkali treatment may be used. The glow discharge treatment herein referred to may be a low temperature plasma caused under a low pressure gas of $10^{-3}$ Torr to 20 Torr, and further preferably a plasma treatment under an atmospheric pressure. The plasma excitation gas refers to a gas that is excited into plasma under the conditions as described above, and examples thereof include argon, helium, neon, krypton, xenon, nitrogen, carbon dioxide, flons such as tetrafluoromethane, mixtures thereof, and the like. These are described in details on page 30 to page 32 in Journal of Technical Disclosure (KOUKAI GIHOU) from Japan Institute of Invention and Innovation, (Technical Disclosure No. 2001-1745, issued on Mar. 15, 2001, Institute of Invention and Innovation), and may be preferably used in the present invention.

(Relaxation Layer)

It is preferred that the film-type substrate includes a relaxation layer, if necessary. The relaxation film is a layer for further improving the repeated folding resistance of a substrate. Since it is possible to use a soft material which is more flexible than a substrate by designing the layer to have a thickness of less than 10 μm, the folding resistance may be improved even when a substrate, which has hardness and is robust, is used. Furthermore, the robustness of a film may be frequently measured by pencil hardness in some cases, and in some cases, it is also possible to obtain effects of recovering scratches produced in a pencil hardness test, and preventing scratches from being generated by providing a flexible relaxation layer.

As a resin used for the relaxation layer, any material may be used as long as the material does not depart from the spirit of the present invention, but a urethane-based polymer, a silicone-based polymer, a polyrotaxane-based polymer, a rubber-based polymer, an elastomer, and the like may be preferably used because the materials have excellent elasticity, and thus may impart softness. From the same viewpoint, the binder resin may be a material which is the same as the substrate. Further, the binder resin may be a binder resin having a crosslinkable group which may be crosslinked by light or heat, and the like. Examples of the crosslinkable group include a group having an ethylenically unsaturated double bond, an epoxy group, a hydrolyzable silyl group, and the like. Hardness may be imparted even to a binder resin by having these groups, so that the scratch resistance may be enhanced. Provided that when the crosslinking density of the binder resin is excessively enhanced, the elasticity is reduced, and thus it is preferred to use the binder resin within the range not damaging the folding resistance.

In addition, in the binder resin, a crosslinkable monomer/oligomer may be used to be blended with the above-described polymer. Further, highly elastic particles and the like may be blended with the crosslinkable monomer/oligomer. As the crosslinkable monomer/oligomer, a urethane-based acrylate, a silicone-based acrylate, an alkylene oxide-modified acrylate and the like may be widely used. In addition, as the highly elastic particles, acrylic resin particles, rubber-based particles, and the like may be used. In particular, particles such as hybrid particles including a rubber-based polymer in the core thereof and an acrylic resin in the shell thereof are preferred due to excellent elasticity and compatibility. Examples of commercially available particles which are highly elastic include M-210 (average primary particle diameter 200 nm, copolymer (BA/St) of styrene (St) with shell: polymethylmethacrylate (MMA) and core: butyl acrylate (BA), manufactured by Kaneka Corporation), M-711 (average primary particle diameter 100 nm, copolymer (BD/St) of styrene with shell: MMA/BA and core: butadiene, manufactured by Kaneka Corporation), M-732 (average primary particle diameter 60 nm, shell: MMA/BA/St, core: BD, manufactured by Kaneka Corporation), and the like.

(Easily Adhesive Layer)

In order to impart adhesion by which the number of times of folding may be withstand to a film-type substrate including the particle layer and the substrate according to the present invention, it is preferred that the substrate includes an easily adhesive layer adjacent to the substrate. For specific examples and preferred examples of the materials and preparation methods used for the easily adhesive layer, reference may be made to the description concerning an easily adhesive layer at the hardcoat layer side in paragraph nos. [0068] to [0107] of Japanese Patent Laid-Open Publication No. 2014-209162.

[Permeation Layer]

It is also preferred that the antireflection article of the present invention is an antireflection article including a permeation layer containing a component which forms a plastic substrate, and a binder resin in the antireflection layer, between the plastic substrate and the antireflection layer.

In the present invention, the permeation layer is a layer (region) including a plastic substrate component and a binder resin component of the antireflection layer. The permeation layer is obtained by applying a solvent having permeability to a plastic substrate (substrate permeable solvent) and a composition for forming an antireflection layer, which includes a binder resin component of the antireflection layer onto a plastic substrate to permeate the substrate permeable solvent into the plastic substrate and simultaneously permeate the binder resin component of the antireflection layer into the plastic substrate. The binder resin component of the antireflection layer is a concept which includes a binder resin, or a monomer which is a material for the binder resin. The plastic substrate component refers to a component which forms a plastic substrate. When the plastic substrate includes other resin layers such as a hardcoat layer on the surface thereof, a component of forming the separate resin layer is also used as a plastic substrate component.

In the present invention, hereinafter, the plastic substrate will refer to a portion which includes a plastic substrate component and does not include a binder resin component of an antireflection layer. Furthermore, the antireflection layer will refer to a portion which includes a binder resin component of an antireflection layer and does not include a plastic substrate component.

Further, when the antireflection article of the present invention is cut by a microtome to analyze the cross-section thereof by a time-of-flight secondary ion mass spectrometer (TOF-SIMS), the permeation layer may be measured as a portion in which the plastic substrate component and the binder resin component of the antireflection layer may be together detected, and the film thickness in this region may also be measured likewise from the information on the cross-section of TOF-SIMS.

In addition, the permeation layer may also be measured by detecting a separate layer in the middle of the substrate and the antireflection layer through observation of the cross-section by, for example, a reflection spectral film thickness meter using interference of light or TEM (transmission electron microscope). As the reflection spectral film thickness meter, FE-3000 (manufactured by OTSUKA ELECTRONICS Co., LTD.), and the like may be used.

The thickness of the permeation layer is preferably 0.1 µm to 5 µm from the viewpoint that it is possible to form a moth eye layer may be formed without maintaining the content ratio of particles in the application composition at an excessively high level.

It is preferred that the permeation layer contains a substrate permeable solvent from the viewpoint that the permeation layer may be efficiently formed. The content of the substrate permeable solvent in the composition for forming the antireflection layer is preferably 10 mass % to 95 mass %, and more preferably 20 mass % to 90 mass %.

The substrate permeable solvent will be described below.

(Other Functional Layers)

The antireflection article of the present invention may include a functional layer other than the antireflection layer.

Preferred examples thereof include an aspect in which the antireflection article includes a hardcoat layer between a substrate and an antireflection layer. Furthermore, the antireflection article may include an easily adhesive layer for imparting adhesion, a layer for imparting antistatic properties, and the like, and may include a plurality of these layers. In this case, an aspect, in which a binder resin of an antireflection layer is permeated into a hardcoat layer, and the like, is also preferred.

[Method of Manufacturing Antireflection Article]

The method of manufacturing an antireflection article according to the present invention is not particularly limited, but the following two methods are preferred.

(Preferred Aspect 1 of Method of Manufacturing Antireflection Article)

A method of manufacturing an antireflection article including a substrate and an antireflection layer containing a binder resin and inorganic particles, wherein the antireflection layer includes a moth eye structure composed of an unevenness shape formed by the inorganic particles on a surface of the antireflection layer, and an area occupancy ratio of the inorganic particles on the surface of the antireflection layer is 25% to 64%, the method including:

applying a composition for forming an antireflection layer, which contains inorganic particles in which 99.9% or more are perfectly spherical particles, the inorganic particles having an average primary particle diameter of 150 nm to 250 nm and a CV value of 4% or less, and a polymerizable compound for forming a binder resin onto a substrate, forming a binder resin layer by polymerizing the applied polymerizable compound for forming the binder resin, and forming the moth eye structure composed of the unevenness shape by etching the binder resin layer.

In Aspect 1, a glass substrate or a plastic substrate may be used as the substrate.

The particles used in the composition for forming the antireflection layer are the same as those described above, but it is preferred that the particles are used in a state of a particle dispersion, and that the shape of the particles are adjusted so as not to be modified when the particles are dispersed.

The polymerizable compound for forming the binder resin is the same as those described above.

As the etching, a vacuum etching, which is strongly anisotropic, is preferred from the viewpoint of forming a preferred shape.

The composition for forming the antireflection layer may include a solvent, a polymerization initiator, a dispersing agent of particles, a leveling agent, an antifouling agent, and the like.

As the solvent, it is preferred to select a solvent having a polarity close to that of the particle from the viewpoint of improving dispersibility. Specifically, when the particles are, for example, metal oxide particles, an alcohol-based solvent is preferred, and examples thereof include methanol, ethanol, 2-propanol, 1-propanol, butanol, and the like. Further, when the particle are, for example, hydrophobically surface-modified metal resin particles, ketone-based, ester-based, carbonate-based, alkane, aromatic solvents and the like are preferred, and examples thereof include methyl ethyl ketone (MEK), dimethyl carbonate, methyl acetate, acetone, methylene chloride, cyclohexanone, and the like. These solvents may be used in mixture of a plurality thereof within the range not deteriorating the dispersibility.

The dispersing agent of the particles may enable particles to be uniformly arranged by lowering the cohesive force between the particles. The dispersing agent is not particularly limited, but is preferably an anionic compound such as sulfate and phosphate, a cationic compound such as an aliphatic amine salt and a quaternary ammonium salt, a nonionic compound, or a polymer compound, and more preferably a polymer compound due to high degree of freedom of selection for each of adsorptive groups and steric repulsion groups. As the dispersing agent, a commercially available product may also be used. Examples thereof include DISPERBYK160, DISPERBYK161, DISPERBYK162, DISPERBYK163, DISPERBYK164, DISPERBYK166, DISPERBYK167, DISPERBYK171, DISPERBYK180, DISPERBYK182, DISPERBYK2000, DISPERBYK2001, DISPERBYK2164, Bykumen, BYK-2009, BYK-P104, BYK-P104S, BYK-220S, Anti-Terra203, Anti-Terra204, and Anti-Terra205 (all trade names), manufactured by BYK-CHEMIE JAPAN K.K., and the like.

The leveling agent may enable the particles or the binder resin to be uniformly arranged by lowering the surface tension of the coating solution to stabilize the solution after application. It is possible to use compounds described, for example, in Japanese Patent Laid-Open Publication No. 2004-331812 and 2004-163610, and the like.

The antifouling agent may suppress adhesion of stains or fingerprints by imparting water and oil repellency to the moth eye structure. It is possible to use compounds, for example, in Japanese Patent Laid-Open Publication No. 2012-88699, and the like.

(Polymerization Initiator)

When the polymerizable compound for forming the binder resin is a photopolymerizable compound, it is preferred that the composition for forming the antireflection layer includes a photopolymerization initiator.

Examples of the photopolymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimers, onium salts, borate salts, active esters, active halogens, an inorganic complex, coumarins, and the like. Specific examples and preferred aspects, commercially available products, and the like of the photopolymerization initiator are described in paragraph nos. [0133] to [0151] of Japanese Patent Laid-Open Publication No. 2009-098658.

Various examples are also described in "Latest UV Curing Technologies" {Technical Information Institute Co., Ltd." (1991), p. 159, and "Ultraviolet Curing System" written by Kiyomi Kato, (1989, published by United Engineering Center), and are useful for the present invention.

The method of applying the composition for forming the antireflection layer is not particularly limited, and a publicly known method may be used. Examples thereof include a dip coat method, an air knife coat method, a curtain coat method, a roller coat method, a wire bar coat method, a gravure coat method, a die coat method, and the like.

From the viewpoint of being easily and uniformly applied, the concentration of solids in the composition for forming the antireflection layer is preferably 5 mass % to 70 mass %, and more preferably 10 mass % to 60 mass %.

(Preferred Aspect 2 of Method of Manufacturing Antireflection Article)

A method of manufacturing an antireflection article including in this order, a plastic substrate, a permeation layer, and an antireflection layer containing a binder resin and inorganic particles, wherein the antireflection layer includes a moth eye structure composed of an unevenness shape formed by the inorganic particles on a surface of the antireflection layer, and an area occupancy ratio of the inorganic particles on the surface of the antireflection layer is 25% to 64%, the method including:

applying, onto a plastic substrate, a composition for forming an antireflection layer containing:

inorganic particles in which 99.9% or more are perfectly spherical particles, the inorganic particles having an average primary particle diameter of 150 nm to 250 nm and a CV value of 4% or less;

a polymerizable compound for forming a binder resin; and a solvent having permeability to a plastic substrate, and making parts of the solvent having permeability to the plastic substrate and the polymerizable compound for forming the binder resin permeate into the plastic substrate to form a permeation layer.

In Aspect 2, a plastic substrate is used as the substrate.

Even in Aspect 2, the particles, polymerizable compound for forming the binder resin, polymerization initiator, dispersing agent of particles, leveling agent, antifouling agent, other additives, application method, and concentration of solids in the composition for forming the antireflection layer are the same as those described above.

(Solvent Having Permeability to Plastic Substrate)

A solvent having permeability to a plastic substrate (also referred to as a substrate permeable solvent in some cases) will be described.

The solvent having permeability to the plastic substrate is a solvent having dissolving ability and swelling ability against the surface of a plastic substrate.

The solvent may uniformly form a moth eye structure by having dissolving ability and swelling ability against the surface of a plastic substrate to allow the binder resin to permeate into the plastic substrate.

Here, a solvent having dissolving ability against a substrate in the present invention means a solvent in which a substrate component (component on the surface of the substrate when the substrate includes a plurality of layers) has a peak area of 400 mV/sec or more when a substrate film with a size of 24 mm×36 mm (thickness 80 μm) is immersed in the solvent contained in a 15 cc bottle at room temperature (25° C.) for 60 seconds and taken out of the bottle, and then the immersing solution is analyzed by gel permeation chromatography (GPC). Otherwise, a solvent having dissolving ability against a substrate also means a solvent when a substrate film with a size of 24 mm×36 mm (thickness 80 μm) is placed into the solvent contained in a 15 cc bottle at room temperature (25° C.) for 24 hours, and the bottle is appropriately shaken to completely dissolve the film and removes the form thereof.

The substrate permeable solvents are different according to the component which forms a plastic substrate, but in the case of a cellulose acylate substrate, methyl ethyl ketone (MEK), dimethyl carbonate, methyl acetate, acetone, methylene chloride, and the like may be preferably used, but the solvent does not matter as long as the solvent may dissolve the substrate. Methyl ethyl ketone (MEK), dimethyl carbonate, and methyl acetate are more preferred.

In the case of an acrylic substrate, dimethyl carbonate, methyl ethyl carbonate, diethyl carbonate, acetone, methyl ethyl ketone (MEK), cyclopentanone, cyclohexanone, methyl acetate, ethyl acetate, and the like are preferred.

In addition, examples of a solvent having dissolving ability exemplified as an example of using a transparent aramid film as a substrate include N-methyl-2-pyrrolidone, which contains 5 mass % of lithium bromide as a coating aid, or N-methyl-2-pyrrolidone, which does not contain lithium bromide, described in paragraph nos. [0044] to [0046] of Japanese Patent No. 5699454.

The composition for forming the antireflection may include a solvent other than a substrate permeable solvent.

[Antireflection Film]

As described above, a preferred form of the antireflection article of the present invention is an antireflection film.

It is preferred that the antireflection film has a repeated folding resistance in which the number of times of folding endurance measured by an MIT tester in accordance with the JIS P8115 (2001) is 1,000 or more.

According to the present invention, since it is possible to obtain an antireflection film having a thin antireflection layer with a moth eye structure laminated on a highly flexible plastic substrate, in which the number of times of folding endurance measured by an MIT tester in accordance with the JIS P8115 (2001) is 1,000 or more, it is also possible to provide a low-reflection surface film which may be used in a flexible image display device.

[Polarizing Plate]

The polarizing plate of the present invention is a polarizing plate including a polarizer and at least one protective film which protects the polarizer, in which the at least one protective film is the antireflection article (antireflection film) of the present invention.

Examples of the polarizer include an iodine-based polarizing film, a dye-based polarizing film which uses a dichroic dye, or a polyene-based polarizing film. The iodine-based polarizing film and the dye-based polarizing film may be generally prepared by using a polyvinyl alcohol-based film.

[Cover Glass]

The cover glass of the present invention includes the antireflection article (antireflection film) of the present invention as a protective film.

[Image Display Device]

The image display device of the present invention includes the antireflection article (antireflection film) of the present invention, a polarizing plate or a cover glass.

The polarizing plate of the present invention may be suitably used for an image display device such as a liquid crystal display (LCD), a plasma display panel (PDP), an electroluminescent display (ELD), or a cathode ray tube display device (CRT), and particularly, a liquid display device is preferred.

In general, the liquid crystal display includes a liquid crystal cell and two polarizing plates disposed at both sides thereof, in which the liquid crystal cell includes a liquid crystal supported between two electrode substrates. Furthermore, an optically anisotropic layer may be disposed between the liquid crystal cell and a polarizing plate at one side, or two optically anisotropic layers may be disposed between the liquid crystal cell and two polarizing plates at both sides in some cases. The liquid crystal cell is preferably a TN-mode, VA-mode, OCB-mode, IPS-mode or ECB-mode crystal cell.

EXAMPLES

Hereinafter, the present invention will be described in more detail with reference to the Examples. The materials, reagents, amounts and ratios of substances, operations, and the like described in the following Examples may be appropriately changed as long as they do not depart from the spirit of the present invention. Therefore, the scope of the present invention is not limited to the following specific examples.

Example 1

[Synthesis of Silica Particles a-1]

67.54 kg of methyl alcohol and 26.33 kg of 28 mass % ammonia water (water and catalyst) were placed into a 200 L-capacity reactor equipped with a stirrer, a dropping device, and a thermometer, and the liquid temperature was adjusted to 33° C. under stirring. Meanwhile, a solution of 12.70 kg of tetramethoxysilane dissolved in 5.59 kg of methyl alcohol was placed into the dropping device. The solution was added dropwise from the dropping device over 44 minutes to the reactor while maintaining the liquid temperature at 33° C., and after the dropwise addition was completed, stirring was further carried out for 44 minutes while maintaining the liquid temperature to the aforementioned temperature and the tetramethoxysilane was subjected to hydrolysis and condensation to obtain a dispersion containing a silica particle precursor. The dispersion was subjected to flash drying using an instantaneous vacuum evaporator (Clarks system CVX-8B type manufactured by Hosokawa Micron Corporation) under conditions of a heating pipe temperature of 175° C. and a reduced pressure of 200 torr (27 kPa) to obtain silica particles a-1. The average particle diameter was 180 nm, and the polydispersity of the particle diameter (CV value): was 3.3%. The indentation hardness was 340 MPa.

[Preparation of Fired Silica Particles b-1]

Into a crucible, 5 kg of silica particles a-1 were placed, fired using an electric furnace at 900° C. for 2 hours, cooled, and then pulverized using a pulverizer to obtain non-classified fired silica particles. Further, crushing and classification were performed using a jet milling classifier (IDS-2 type manufactured by Nippon Pneumatic Mfg. Co., Ltd.) to obtain fired silica particles b-1. The average primary diameter of the obtained silica particles was 180 nm, and the polydispersity of the particle diameter (CV value): was 3.3%. The indentation hardness was 470 MPa.

[Preparation of Fired Silica Particles b-2]

The average primary particle diameter of silica particles obtained by adjusting the dropwise addition and stirring time for b-1 was 210 nm, and the polydispersity of the particle diameter (CV value): was 3.6%. The indentation hardness was 450 MPa.

[Preparation of Fired Silica Particles b-3]

Into a high-speed stirring mixer Spartan mixer (manufactured by DULTON Co.), 2 kg of each of silica particles b-1 and b-2 was introduced, stirred for 30 minutes, and then taken out to obtain fired silica particles b-3. The average primary diameter of the obtained silica particles was 195 nm, and the polydispersity of the particle diameter (CV value): was 14.6%.

[Preparation of Fired Silica Particles b-5]

The average primary particle diameter of silica particles b-4 obtained by adjusting the dropwise addition and stirring time for b-1 was 195 nm, and the polydispersity of the particle diameter (CV value): was 3.4%. The indentation hardness was 462 MPa.

Into a high-speed stirring mixer Spartan mixer (manufactured by DULTON Co.), 2 kg of each of silica particles b-1 and b-4 was introduced, stirred for 30 minutes, and then taken out to obtain fired silica particles b-5. The average primary diameter of the obtained silica particles was 188 nm, and the polydispersity of the particle diameter (CV value): was 7.6%.

[Preparation of Silane Coupling Agent-Treated Silica Particles c-1]

5 kg of the non-classified fired silica particles b-1 were placed into a 20 L-capacity Henschel Mixer (FM20J type manufactured by Mitsui Kozan KK) equipped with a heating jacket. A solution of 45 g of 3-acryloxypropyltrimethoxysilane (KBM5103 manufactured by Shin-Etsu Chemical Co., Ltd.) dissolved in 90 g of methyl alcohol was added dropwise to the stirring of fired silica particles b-1, and mixed. Thereafter, the temperature was raised up to 150° C. over about 1 hour while the mixture was mixed and stirred, and a heat treatment was carried out by maintaining the mixture at 150° C. for 12 hours. In the heat treatment, the deposits on the wall surface were scraped and dropped off while a scraping device was constantly rotated in direction opposite to that of a stirring blade. In addition, the deposits on the wall surface were also scraped and dropped off appropriately using a spatula. After the heating, the cooling was performed, and crushing and classification were performed using a jet milling classifier to obtain silane coupling agent-treated silica particles c-1. The average particle diameter was 181 nm, and the polydispersity of the particle diameter (CV value) was 3.3%. The indentation hardness was 470 MPa. An acryloyl group was imparted to the surface of silica particles c-1.

[Measurement of Indentation Hardness of Metal Oxide Particles]

Into 91 g of ethanol, 10 g of each of the metal oxide particles, 0.3 g of Irgacure184 (manufactured by BASF Japan Ltd.), and 6.7 g of KAYARAD PET30 (manufactured by Nippon Kayaku Co., Ltd.) were introduced, stirred for 10 minutes, and then, dispersed by an ultrasonic disperser for 10 minutes to obtain 15% by mass of a dispersion. The dispersion was applied on a glass plate in a wet applying amount of about 3 ml/m², and cured by irradiating ultraviolet rays at an irradiation dose of 600 mJ/cm² by an air-cooled metal halide lamp while purging with nitrogen, such that an oxygen concentration became 0.1 vol % or less in the atmosphere. Thereafter, it was observed by SEM that the metal oxide particles were not stacked in one or more tiers. For this sample, the indentation hardness of the metal oxide particles was measured using a triboindenter (TI-950 manufactured by Hysitron, Inc.) under measurement conditions of a diamond indenter having a diameter of 1 µm and an indentation load of 0.05 mN.

[Dispersion Prescription A]

Into a 480 ml vessel, 50 g of silica particles, 200 g of MEK (methyl ethyl ketone), and 600 g of zirconia beads having a diameter of 0.5 mm were placed, and dispersed by a paint conditioner (manufactured by NISHIYAMA SEISAKUSHO CO., LTD.) at 50 Hz for 1 hour.

[Dispersion Prescription B]

Dispersion was carried out for 6 hours in the same manner as in Dispersion Prescription A.

[Dispersion Prescription C]

Into a 1 L bottle vessel having a diameter of 12 cm, 50 g of silica particles, 200 g of MEK, and 600 g of zirconia beads having a diameter of 0.05 mm, set in a ball mill V-2M (IRIE SHOKAI Co., Ltd.), and dispersed at 250 rotations/minutes for 10 hours.

(Preparation of Composition for Forming Hardcoat Layer)

Into a mixing tank, 10.5 parts by mass of methyl acetate, 10.5 parts by mass of MEK, 20.52 parts by mass of NK ester A-TMMT (manufactured by Shin-Nakamura Chemical Co., Ltd.), 8.30 parts by mass of AD-TMP (manufactured by Shin-Nakamura Chemical Co., Ltd.), and 0.94 parts by mass of Irgacure184 were introduced, stirred, and filtered with a polypropylene-made filter having a pore size of 0.4 µm to prepare a coating solution for a hardcoat layer (concentration of solids 58 mass %).

(Manufacture of Substrate Including Hardcoat Layer)

A coating solution for forming a hardcoat layer was applied on a cellulose triacetate film (TDH60UF, manufactured by Fujifilm Corporation), and cured by irradiating ultraviolet rays at an irradiation dose of 30 mJ/cm² by an air-cooled metal halide lamp while purging with nitrogen to form a hardcoat layer having a film thickness of 6 µm. By doing this, a substrate including a hardcoat layer was manufactured.

(Preparation of Coating Solution A for Forming Antireflection Layer)

Into a mixing tank, 29 g of silica particle dispersion (concentration of silica particles 20 mass %), 0.5 g of Irgacure127, 2.3 g of NK Oligo U-4HA, 4.7 g of KAYARAD PET30, 4.7 g of C3, 30 g of MEK, and 30 g of ethanol were introduced, stirred for 60 minutes, dispersed by an ultrasonic disperser for 15 minutes, and filtered with a polypropylene-made filter having a pore size of 5 µm to prepare a coating solution A for forming an antireflection layer.

Meanwhile, the silica particle dispersion was a dispersion of silica particles described in Table 1 dispersed in an MEK solvent by the dispersion prescription described in Table 1.

Each of the compounds used will be described below.

KAYARAD PET30 (manufactured by Nippon Kayaku Co., Ltd.): Mixture of 60% of pentaerythritol triacrylate and 40% of pentaerythritol tetraacrylate Irgacure127: Photopolymerization initiator (manufactured by BASF Japan Ltd.)

NK Oligo U-4HA (manufactured by Shin-Nakamura Chemical Co., Ltd.)

[C3]

To a flask equipped with a reflux condenser and a thermometer, 19.3 g of KBE-9007 manufactured by Shin-Etsu Chemical Co., Ltd., 3.9 g of glycerin 1,3-bisacrylate, 6.8 g of hydroxyethyl acrylate, 6.8 g of 2-hydroxyethyl acrylate, 0.1 g of dibutyltin dilaurate, and 70.0 g of toluene were added, and stirred at room temperature for 12 hours. After the stirring, 500 ppm of methylhydroquinone was added thereto, and distillation was performed under reduced pressure to obtain C3.

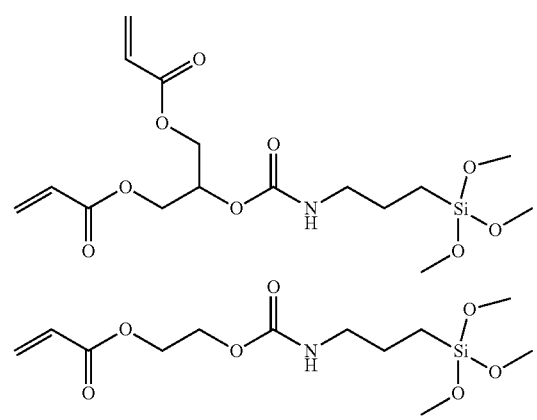

C3

(Preparation of Antireflection Films A-1 to A-15: Vacuum Etching)

Each of the compositions for forming the antireflection layer described in the following Table 1 was applied in a wet applying amount of about 2.8 ml/m² on a hardcoat layer of a substrate including a hardcoat layer, and cured by irradiating ultraviolet rays at an irradiation dose of 600 mJ/cm² by an air-cooled metal halide lamp while purging with nitrogen, such that an oxygen concentration became 0.1 vol % or less in the atmosphere to prepare an antireflection film. The concentration of solids of the coating solution for forming the antireflection layer was constantly maintained and the ratio of the total amount of the silica dispersion and the binder (NK Oligo U-4HA, PET30, and C3) was adjusted, such that the area occupancy ratio of the particles became the value described in Table 1. Furthermore, the initiator was adjusted so as to fix the ratio with the amount of the binder.

Subsequently, the surface of the obtained binder resin layer was subjected to plasma treatment using a high-frequency plasma device under a condition of 13.56 MHz, the binder resin was etched, and the unevenness was actualized on the surface to obtain Antireflection Films A-1 to A-15. The plasma treatment was carried out by applying a high frequency wave of 50 W under conditions of a pressure of 2.7 Pa for 30 seconds while introducing a gas with a composition of oxygen:argon=1:1.

(Preparation of Antireflection Film A-16: Permeation)

A composition for forming an antireflection layer, including fired silica particles b-1 was applied in a wet applying amount of about 2.8 ml/m² on a hardcoat layer of a substrate including a hardcoat layer, dried at 120° C. for 5 minutes, and then cured by irradiating ultraviolet rays at an irradiation dose of 600 mJ/cm² by an air-cooled metal halide lamp while purging with nitrogen, such that an oxygen concentration became 0.1 vol % or less in the atmosphere to prepare antireflection film A-16.

(Evaluation of Antireflection Film)

Various characteristics of the antireflection film were evaluated by the following method. The results are described in Table 1.

(Reflectance)

In a state where the rear surface (cellulose triacetate film side) of the antireflection film was roughened with sandpaper, and then treated with black ink to remove the rear surface reflection, a spectrophotometer V-550 (manufactured by JASCO CORPORATION) was provided with an adapter ARV-474 to measure an integrated reflectance at an incident angle of 5° in a wavelength region of 380 nm to 780 nm, and the average reflectance was calculated to evaluate antireflection properties.

(Durability of Moth Eye Structure Against Pressure in Thickness Direction)

The substrate side of the antireflection film sample was adhered to a glass plate, the surface of the antireflection layer was subjected to scratch test using a diamond indenter having a diameter of 25 μm under conditions of a load of 10 g and 700 mm/minute, and then the surface of the antireflection layer was observed to evaluate the sample in accordance with the following criteria.

A: No trace was observed after the test

B: Two or less stripes of weak traces were observed after the test, but were not problematic C: Three or more stripes of weak traces were observed after the test, but were within an allowable range D: Significant traces were observed after the test, and thus were conspicuous (Distance Between Closest Particles)

An antireflection film sample was cut by a microtome to produce a cross-section, carbon was deposited on the cross-section, and then etching treatment was carried out for 10 minutes. 20 visual fields were observed and captured at 5,000-fold magnification using a scanning electron microscope (SEM). From the image obtained, the distance between adjacent vertices of the inorganic particles was calculated as an average value by measuring the lengths of 100 points. A value obtained by subtracting an average particle diameter of the total particles from the distance was used as the distance between closest particles.

(Blue Tint)

The hue was subjected to sensory evaluation by 20 persons by adhering the antireflection film to the surface of the display which displayed black.

A: One or less person who felt even slightly blue tint
B: Two or three persons who felt even slightly blue tint
C: Four or five persons who felt even slightly blue tint
D: Six or more persons who felt even slightly blue tint (Ratio of Perfectly Spherical Particles)

From the SEM image of the antireflection film, 1,000 particles were observed, and the ratio of major axis to minor axis when observed in a direction vertical to the surface of the antireflection layer was calculated, and particles having a ratio of 0.95 to 1.05 were defined as perfectly spherical particles.

(Area Occupancy Ratio of Particles)

The area occupancy ratio of convex portion particles was obtained by capturing two visual fields of the surface of the antireflection layer in a direction vertical to the surface of the antireflection layer at 10,000-fold magnification by SEM, and counting the number of particles forming the convex portion. When it is difficult to distinguish particles because the resin included in the antireflection layer covers the particles, an etching treatment was carried out until the particles were exposed and could be observed.

The area occupancy ratio was calculated using the Equation: (Area Occupancy Ratio)=$(\pi \times R^2)/4 \times$(number of particles)/(total area)$\times 100$(%)

R denotes an average primary particle diameter of particles.

TABLE 1

| Level | Particle (Average Primary Particle Diameter, CV Value) | Ratio of Perfectly Spherical Particles | Area Occupancy Ratio of Inorganic Particles | Distance Between Closest Particles | Dispersion Prescription | Method of Removing Binder | Blue Tint | Reflectance | Remark |
|---|---|---|---|---|---|---|---|---|---|
| A-1 | b-1 (180 nm, CV 3.3%) | 92% | 35% | 14 nm | A | Vacuum Etching | B | 1.70% | Comparative |
| A-2 | b-1 (180 nm, CV 3.3%) | 95% | 35% | 13 nm | B | Vacuum Etching | B | 1.60% | Comparative |
| A-3 | b-1 (180 nm, CV 3.3%) | 100% | 80% | 25 nm | C | Vacuum Etching | D | 0.50% | Comparative |
| A-4 | b-1 (180 nm, CV 3.3%) | 100% | 70% | 32 nm | C | Vacuum Etching | D | 0.46% | Comparative |
| A-5 | b-1 (180 nm, CV 3.3%) | 100% | 60% | 40 nm | C | Vacuum Etching | C | 0.45% | Inventive |
| A-6 | b-1 (180 nm, CV 3.3%) | 100% | 44% | 55 nm | C | Vacuum Etching | B | 0.51% | Inventive |
| A-7 | b-1 (180 nm, CV 3.3%) | 100% | 35% | 66 nm | C | Vacuum Etching | A | 0.55% | Inventive |
| A-8 | a-1 (180 nm, CV 3.3%) | 100% | 35% | 67 nm | C | Vacuum Etching | A | 0.52% | Inventive |
| A-9 | b-2 (210 nm, CV 3.6%) | 100% | 35% | 63 nm | C | Vacuum Etching | A | 0.56% | Inventive |
| A-10 | b-3 (195 nm, CV 14.6%) | 100% | 35% | 25 nm | C | Vacuum Etching | A | 1.75% | Comparative |
| A-11 | b-5 (188 nm, CV 7.6%) | 100% | 35% | 29 nm | C | Vacuum Etching | A | 1.60% | Comparative |
| A-12 | c-1 (181 nm, CV 3.3%) | 100% | 35% | 63 nm | C | Vacuum Etching | A | 0.59% | Inventive |
| A-13 | b-1 (180 nm, CV 3.3%) | 100% | 25% | 79 nm | C | Vacuum Etching | A | 0.60% | Inventive |
| A-14 | b-1 (180 nm, CV 3.3%) | 100% | 17% | 54 nm | C | Vacuum Etching | A | 1.70% | Comparative |
| A-15 | b-1 (180 nm, CV 3.3%) | 100% | 10% | 42 nm | C | Vacuum Etching | A | 2.40% | Comparative |
| A-16 | b-1 (180 nm, CV 3.3%) | 100% | 49% | 40 nm | C | Permeation | B | 1.10% | Inventive |

When Samples A-3 to A-15 are compared with each other, it can be seen that the blue tint has been improved when the occupancy area of particles is low. Meanwhile, when the ratio of perfectly spherical particles is low (A-1 and A-2), or when the polydispersity (CV value) of particles is high (A-10 and A-11), it can be seen that the reflectance is high. Further, A-7, A-8, and A-12 were subjected to durability test of the moth eye structure against pressure in a thickness direction. It was confirmed that the durability of the moth eye structure against pressure in the thickness direction had been improved by allowing A-7 (Evaluation Result: B) to have an indentation hardness higher than that of A-8 (Evaluation Result: C). In addition, it was confirmed that A-12 (Evaluation Result: A) had a more improved durability by particles to which an acryloyl group had been imparted by surface modification than A-7 (Evaluation Result: B).

Example 2: Low-Reflection Film Having Excellent Flexible Suitability

[Manufacture of Substrate]
(Manufacture of Substrate Film S-1)

An acrylic resin (PMMA) having a weight average molecular weight of 1,300,000 and a 100% methylmethacrylate (MMA) ratio was synthesized by the following method. To a 1 L 3-neck flask equipped with a mechanical stirrer, a thermometer, and a cooling tube, 300 g of ion exchange water and 0.6 g of polyvinyl alcohol (saponification degree 80%, polymerization degree 1,700) to completely dissolve polyvinyl alcohol, and then 100 g of methylmethacrylate and 0.15 g of benzoyl peroxide were added, and reaction was carried out at 85° C. for 6 hours. The suspension obtained was filtered by a nylon-made filter cloth and washed, and the filtered material was dried at 50° C. overnight to obtain a desired polymer in the form of a bead (92.0 g).

Into a mixing tank, 100 parts by mass of the aforementioned acrylic resin (PMMA having a weight average molecular weight of 1,300,000), 50 parts by mass of rubber particles having a core-shell structure (Kane Ace M-210 manufactured by Kaneka Corporation), 0.1 parts by mass of SUMILIZER GS manufactured by Sumitomo Chemical Co., Ltd., 383 parts by mass of dichloromethane as a solvent, and 57 parts by mass of methanol were introduced and stirred while being heated, and each component was dissolved to prepare the substrate.

The solution prepared as described above was uniformly case on a stainless steel-made endless band (casting substrate) from the die to form a casting film. After the solvent included in the casting film on the substrate was dried and removed, the casting film was peeled and conveyed as a film having self-supporting characteristics from the casting substrate, and dried until the solvent was completely removed at 140° C. By the process described above, Substrate Film S-1 having a thickness of 40 μm was manufactured. The number of times of folding endurance measured by the method to be described below was 150,000.

(Manufacture of Substrate Film S-2)
[Synthesis of Aromatic Polyamide]

Into a polymerization bath equipped with a stirrer, 674.7 kg of N-methyl-2-pyrrolidone 10.6 g of anhydrous lithium bromide (manufactured by Sigma-Aldrich Japan KK), 33.3 g of 2,2'-ditrifluoromethyl-4,4'-diaminobiphenyl ("TFMB" manufactured by Toray Fine Chemical Co., Ltd.), and 2.9 g of 4,4'-diaminodiphenylsulfone ("44DDS" manufactured by Wakayama Seika Kogyo Co., Ltd.) were placed and cooled to 15° C. under nitrogen atmosphere, and 18.5 g of terephthalic acid dichloride (manufactured by Tokyo Chemical Industry Co., Ltd.) and 6.4 g of 4,4'-biphenyldicarbonylchloride ("4BPAC" manufactured by Toray Fine Chemical Co., Ltd.) were added in portions 4 times over 300 minutes while being stirred. The mixture was stirred for 60 minutes, and then hydrogen chloride generated from the reaction was neutralized with lithium carbonate to obtain a polymer solution.

A portion of the polymer solution obtained above was cast on an endless belt at 120° C. using a T die, such that the thickness of the final film was 40 μm, and the film was dried so as to have a polymer concentration of 40 mass %, and peeled from the endless belt. Subsequently, the film including the solvent was stretched by 1.1 times in the MD direction in the atmosphere at 40° C., and washed with water at 50° C. to remove the solvent. Furthermore, the film was stretched by 1.2 times in the TD direction in a drying furnace at 340° C. to obtain Substrate Film S-2 composed of polyamide and having a thickness of 40 m. The number of times of folding endurance of Substrate Film S-2 was 10,000.

(Manufacture of Substrate Film PET40)

A polyethylene terephthalate substrate having a thickness of 40 μm was manufactured by the method described in paragraph nos. [0148] to [0171] of Japanese Patent Laid-Open Publication No. 2014-209162. The number of times of folding endurance of Substrate Film PET40 was 1,700,000.

[Preparation of Coating Solution]
[Preparation of Silane Coupling Agent-Treated Alumina Particles d-1]

Alumina particles having an average particle diameter of 185 nm and a polydispersity of the particle diameter (CV value): 4% were obtained using a wet classification device Superclone TR-5 from DENKA ASFP-20 (alumina particles).

5 kg of the particles were place into a 20 L-capacity Henschel Mixer (FM20J type manufactured by Mitsui Kozan KK) equipped with a heating jacket. A solution of 45 g of 3-acryloxypropyltrimethoxysilane (KBM5103 manufactured by Shin-Etsu Chemical Co., Ltd.) dissolved in 90 g of methyl alcohol was added dropwise to the stirring of the particle, and mixed. Thereafter, the temperature was raised up to 150° C. over about 1 hour while the mixture was mixed and stirred, and a heat treatment was carried out by maintaining the mixture at 150° C. for 10 hours. In the heat treatment, the deposits on the wall surface were scraped and dropped off while a scraping device was constantly rotated in direction opposite to that of a stirring blade. In addition, the deposits on the wall surface were also scraped and dropped off appropriately using a spatula. After the heating, the cooling was performed, and crushing and classification were performed using a jet milling classifier to obtain silane coupling agent-treated silica particles d-1. The average particle diameter was 185 nm, and the polydispersity of the particle diameter (CV value): was 3.9%. The indentation hardness was 3,800 MPa.

(Preparation of Coating Solution B for Forming Antireflection Layer)

A dispersion of Particles d-1 was prepared by Dispersion Prescription C in the same manner as in Example 1, and the coating solution B for forming an antireflection layer was prepared in the same manner as in the coating solution A for forming an antireflection layer.

[Dispersion Prescription D]

Into a 480 ml vessel, 50 g of silica particles d-1, 200 g of cyclohexanone, and 600 g of zirconia beads having a diameter of 0.5 mm were placed, and dispersed by a paint conditioner (manufactured by NISHIYAMA SEISAKUSHO CO., LTD.) at 50 Hz for 1 hour.

(Preparation of Coating Solution C for Forming Antireflection Layer)

Into a mixing tank, 29 g of silica particle dispersion (concentration of silica particles 20 mass %) dispersed by Dispersion Prescription D, 0.5 g of Irgacure127, 2.3 g of NK Oligo U-4HA, 4.7 g of KAYARAD PET30, 4.7 g of C3, and 60 g of methylisobutylketone (MIBK), were introduced, stirred for 60 minutes, dispersed by an ultrasonic disperser for 15 minutes, and filtered with a polypropylene-made filter having a pore size of 5 μm to prepare a coating solution C for forming an antireflection layer.

Oily black ink was coated on a rear surface of the sample which was completely rubbed, and scratches in the rubbed portion were visually observed under a reflected light and evaluated:

A: No scratches observable at all even in a very careful observation.

B: Weak scratches observable in a very careful observation, but no problem

C: Scratches readily observable at one glance, and thus very conspicuous

TABLE 2

| | | | | | | | Evaluation Result | | | | |
|---|---|---|---|---|---|---|---|---|---|---|---|
| Level | Sub-strate | Particle (Average Primary Particle Diameter, CV Value) | Coating solution for Forming Antireflection Layer | Ratio of Perfectly Spherical Particles | Area Occupancy Ratio of Inorganic Particles | Distance Between Closest Particles | Blue Tint | Number of Times of Folding Endurance [Times] | Scratch Resistance | Reflec-tance | Remark |
| B-1 | PET 40 | c-1 (181 nm, CV 3.3%) | A | 100% | 35% | 63 nm | A | 1,700,000 | B | 0.58% | Inventive |
| B-2 | PET 40 | c-1 (181 nm, CV 3.3%) | A | 100% | 60% | 40 nm | C | 1,700,000 | B | 0.44% | Inventive |
| B-3 | S-1 | c-1 (181 nm, CV 3.3%) | A | 100% | 35% | 63 nm | A | 150,000 | B | 0.60% | Inventive |
| B-4 | S-2 | c-1 (181 nm, CV 3.3%) | A | 100% | 35% | 63 nm | A | 10,000 | B | 0.59% | Inventive |
| B-5 | S-2 | c-1 (181 nm, CV 3.3%) | A | 100% | 60% | 40 nm | C | 10,000 | B | 0.45% | Inventive |
| B-6 | PET 40 | d-1 (185 nm, CV 3.9%) | B | 100% | 35% | 63 nm | A | 1,700,000 | A | 0.65% | Inventive |
| B-7 | PET 40 | d-1 (185 nm, CV 3.9%) | B | 100% | 60% | 40 nm | C | 1,700,000 | A | 0.53% | Inventive |
| B-8 | S-1 | d-1 (185 nm, CV 3.9%) | B | 100% | 35% | 63 nm | A | 150,000 | A | 0.70% | Inventive |
| B-9 | S-2 | d-1 (185 nm, CV 3.9%) | C | 100% | 35% | 63 nm | A | 10,000 | A | 0.65% | Inventive |
| B-10 | S-2 | d-1 (185 nm, CV 3.9%) | C | 100% | 60% | 40 nm | C | 10,000 | A | 0.51% | Inventive |

[Manufacture of Antireflection Films B-1 to B-10]

The coating solution for forming the antireflection layer described in Table 2 was applied on the substrate described in Table 2 in the same manner as in Example 1, and plasma treatment was carried out in the same manner as in the plasma treatment in Example 1 to obtain Antireflection Films B-1 to B-10.

(Evaluation of Antireflection Film)

(Number of Times of Folding Endurance)

An antireflection film sample having a width of 15 mm and a length of 80 mm while being left to stand still in a state of 25° C. and a relative humidity of 65% was measured in accordance with the JIS P8115 (2001) under conditions of a load of 500 g using a folding endurance tester (MIT. BE-201 type manufactured by TESTER SANGYO CO, LTD., folding radius 0.4 mm) to evaluate the film as the number until the film was broken. The more the number of times of folding endurance is, the stronger the film is against folding, so that the repeated folding resistance is excellent.

(Evaluation of Steel Wool Scratch Resistance)

The surface of the antireflection film sample was rubbed and tested under the following conditions using a rubbing tester, and the result was used as an index of scratch resistance.

Evaluation environment condition: 25° C., Relative humidity 60%

Rubbing material: Steel wool (manufactured by NIHON STEEL WOOL Co., Ltd., Grade No. 0000) was wound at a rubbing end portion (1 cm×1 cm) of a tester which was brought into contact with a sample and fixed with a band Moving Distance (One Way): 13 cm.
Rubbing speed: 13 cm/sec.
Load: 200 g/cm$^2$
Contact Area at End Portion: 1 cm×1 cm.
Number of Rubbings: 10 reciprocating cycles As can be seen from Table 2, it can be seen that in the sample of the present invention, the reflectance is low, blue tint is suppressed from being generated, and the number of times of folding endurance and steel wool scratch resistance may be enhanced to an excellent level.

The invention claimed is:

1. An antireflection article comprising:
a substrate; and
an antireflection layer containing a binder resin and inorganic particles,
wherein the inorganic particles are particles having an average primary particle diameter of 150 nm to 250 nm and a polydispersity of the average primary particle diameter, which is a CV value, is 4% or less,
99.9% or more of the inorganic particles are perfectly spherical particles,
the antireflection layer includes a moth eye structure composed of an unevenness shape formed by the inorganic particles on a surface of the antireflection layer, and
an area occupancy ratio of the inorganic particles on the surface of the antireflection layer is 25% to 64%.

2. The antireflection article of claim 1,
wherein an average value of distances between closest particles of the inorganic particles is 30 nm or more.

3. The antireflection article of claim 1,
wherein the area occupancy ratio of the inorganic particles on the surface of the antireflection layer is 25% to 50%.

4. The antireflection article of claim 1,
wherein the inorganic particles have an indentation hardness of 400 MPa or more.

5. The antireflection article of claim 1,
wherein the inorganic particles are silica particles.

6. The antireflection article of claim 1, wherein the inorganic particles are alumina particles.

7. The antireflection article of claim 1, wherein the inorganic particles are surface-modified particles.

8. The antireflection article of claim 1, wherein the substrate is a plastic substrate.

9. The antireflection article of claim 8, wherein the antireflection article comprises a permeation layer containing a component which forms the plastic substrate, and a binder resin in the antireflection layer, between the plastic substrate and the antireflection layer.

10. The antireflection article of claim 8, wherein the plastic substrate is a film-type plastic substrate, and
the antireflection article is a film-type antireflection article.

11. The antireflection article of claim 10, wherein the antireflection film has a repeated folding resistance in which a number of times of folding endurance measured by an MIT tester in accordance with the JIS P8115 (2001) is 1,000 or more.

12. A polarizing plate comprising a polarizer and at least one protective film which protects the polarizer,
wherein the at least one protective film is the antireflection article of claim 10.

13. A cover glass comprising the antireflection article of claim 10 as a protective film.

14. An image display device comprising the antireflection article of claim 1.

15. A method of manufacturing an antireflection article comprising a substrate and an antireflection layer containing a binder resin and inorganic particles, wherein the antireflection layer includes a moth eye structure composed of an unevenness shape formed by the inorganic particles on a surface of the antireflection layer, and an area occupancy ratio of the inorganic particles on the surface of the antireflection layer is 25% to 64%, the method comprising:
applying a composition for forming an antireflection layer, which contains inorganic particles in which 99.9% or more are perfectly spherical particles, the inorganic particles having an average primary particle diameter of 150 nm to 250 nm and a polydispersity of the average primary particle diameter, which is a CV value, of 4% or less, and a polymerizable compound for forming a binder resin onto a substrate,
forming a binder resin layer by polymerizing the applied polymerizable compound for forming the binder resin, and
forming the moth eye structure composed of the unevenness shape by etching the binder resin layer.

16. A method of manufacturing an antireflection article comprising, in this order, a plastic substrate, a permeation layer, and an antireflection layer containing a binder resin and inorganic particles, wherein the antireflection layer includes a moth eye structure composed of an unevenness shape formed by the inorganic particles on a surface of the antireflection layer, and an area occupancy ratio of the inorganic particles on the surface of the antireflection layer is 25% to 64%, the method comprising:
applying, onto a plastic substrate, a composition for forming an antireflection layer containing:
inorganic particles in which 99.9% or more are perfectly spherical particles, the inorganic particles having an average primary particle diameter of 150 nm to 250 nm and a polydispersity of the average primary particle diameter, which is a CV value, of 4% or less;
a polymerizable compound for forming a binder resin; and
a solvent having permeability to a plastic substrate, and
making parts of the solvent having permeability to the plastic substrate and the polymerizable compound for forming the binder resin permeate into the plastic substrate to form a permeation layer.

* * * * *